United States Patent
Kim et al.

(10) Patent No.: US 11,652,214 B2
(45) Date of Patent: May 16, 2023

(54) MIXED CATALYST FOR FUEL CELL, METHOD FOR PREPARING SAME, METHOD FOR FORMING ELECTRODE BY USING SAME, AND MEMBRANE-ELECTRODE ASSEMBLY COMPRISING SAME

(71) Applicant: KOLON INDUSTRIES, INC., Seoul (KR)

(72) Inventors: Jung Ho Kim, Seoul (KR); Kah-Young Song, Seoul (KR); Nakwon Kong, Seoul (KR); Jusung Lee, Seoul (KR); Kyoungsik Nam, Seoul (KR); Chanmi Park, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 27 days.

(21) Appl. No.: 17/625,837

(22) PCT Filed: Apr. 5, 2021

(86) PCT No.: PCT/KR2021/004190
§ 371 (c)(1),
(2) Date: Jan. 10, 2022

(87) PCT Pub. No.: WO2021/241874
PCT Pub. Date: Dec. 2, 2021

(65) Prior Publication Data
US 2022/0278335 A1 Sep. 1, 2022

(30) Foreign Application Priority Data

May 28, 2020 (KR) .................. 10-2020-0064513

(51) Int. Cl.
*H01M 4/86* (2006.01)
*H01M 4/88* (2006.01)
(Continued)

(52) U.S. Cl.
CPC ....... *H01M 4/8657* (2013.01); *H01M 4/8652* (2013.01); *H01M 4/8825* (2013.01);
(Continued)

(58) Field of Classification Search
CPC . H01M 2300/0082; H01M 2300/0085; H01M 4/8652; H01M 4/8657;
(Continued)

(56) References Cited

U.S. PATENT DOCUMENTS 8,114,372 B2  2/2012  Pak

FOREIGN PATENT DOCUMENTS

CN  105142778 A  12/2015
CN  105142779 A  12/2015
(Continued)

OTHER PUBLICATIONS

Machine Translation KR20170089486A (Year: 2017).*
The office action dated Apr. 1, 2023 related to the corresponding Korean Patent application.

*Primary Examiner* — Victoria H Lynch
(74) *Attorney, Agent, or Firm* — Harvest IP Law LLP (57) ABSTRACT

Disclosed are a mixed catalyst, a method for preparing same, a method for forming an electrode by using same, and a membrane-electrode assembly comprising same, the mixed catalyst having uniform physical features within a predetermined range, which are suitable for the manufacture of an electrode and membrane-electrode assembly having desired performance and durability. The mixed catalyst comprises: a first catalyst, which includes a first support and first catalyst metal particles distributed on the first support, and has a first BET surface area and a first total pore volume; and a second catalyst, which includes a second support and second catalyst metal particles distributed on the second support, and has a second BET surface area different from the first BET (Continued)

surface area and a second total pore volume different from the first total pore volume.

15 Claims, 4 Drawing Sheets

(51) Int. Cl.
    *H01M 4/92*           (2006.01)
    *H01M 8/1004*       (2016.01)
    *H01M 8/1018*       (2016.01)

(52) U.S. Cl.
    CPC ........... *H01M 4/8882* (2013.01); *H01M 4/92* (2013.01); *H01M 8/1004* (2013.01); *H01M 8/1018* (2013.01); *H01M 2300/0082* (2013.01); *H01M 2300/0085* (2013.01)

(58) Field of Classification Search
    CPC .. H01M 4/881; H01M 4/8814; H01M 4/8825; H01M 4/8828; H01M 4/8882; H01M 4/92; H01M 4/925; H01M 8/1004; H01M 8/1018; Y02E 60/50
    See application file for complete search history.

(56) References Cited

FOREIGN PATENT DOCUMENTS

| CN | 106663819 A | 5/2017 |
|---|---|---|
| KR | 20130037741 A | 4/2013 |
| KR | 20140093587 A | 7/2014 |
| KR | 20140121718 A | 10/2014 |
| KR | 20170089486 A | 8/2017 |
| KR | 20180004672 A | 1/2018 |
| KR | 20180076907 A | 7/2018 |
| TW | 201929304 A | 7/2019 |

\* cited by examiner

MIXED CATALYST FOR FUEL CELL, METHOD FOR PREPARING SAME, METHOD FOR FORMING ELECTRODE BY USING SAME, AND MEMBRANE-ELECTRODE ASSEMBLY COMPRISING SAME

CROSS REFERENCE TO RELATED APPLICATIONS

This application is a National Stage of International Application No. PCT/KR2021/004190 filed Apr. 5, 2021, claiming priority based on Korean Patent Application No. 10-2020-0064513 filed May 28, 2020.

TECHNICAL FIELD

The present disclosure relates to a mixed catalyst for fuel cells, a method of preparing the same, a method of forming an electrode using the same, and a membrane-electrode assembly including the same. More particularly, the present disclosure relates to a mixed catalyst having uniform physical properties within a predetermined range suitable for the manufacture of electrodes and membrane-electrode assemblies having desired performance and durability, a method of preparing the same, a method of forming an electrode using the same, and a membrane-electrode assembly including the same.

BACKGROUND

A polymer electrolyte membrane fuel cell (PEMFC), which generates electricity using a stacked structure of unit cells, each including a membrane-electrode assembly (MEA) and a separator (also referred to as a "bipolar plate"), is drawing attention as a next-generation energy source capable of replacing fossil fuels due to the high energy efficiency and environmental friendliness thereof.

The membrane-electrode assembly generally includes an anode (also referred to as a "fuel electrode"), a cathode (also referred to as an "air electrode"), and a polymer electrolyte membrane interposed therebetween.

When fuel such as hydrogen gas is supplied to an anode, the hydrogen at the anode is oxidized to produce a proton ($H^+$) and an electron ($e^-$). The produced proton is transferred to the cathode through the polymer electrolyte membrane, whereas the produced electron is transferred to the cathode through an external circuit. Oxygen supplied to the cathode is bonded to the proton and the electron, and thus is reduced to produce water.

In an effort to increase the active surface area of the catalyst for the manufacture of an electrode in a membrane-electrode assembly, a catalyst formed by dispersing metal catalyst particles on the surface of an electrically conductive support (e.g., carbon, metal oxide or $C_3N_4$) has been developed.

In order to effectively manufacture a fuel cell and/or a membrane-electrode assembly that can satisfy various requirements for each technical field or final product to which the fuel cell is applied, a catalyst having physical properties (e.g., physical properties such as BET surface area, micropore surface area, external surface area, total pore volume, micropore volume and mesopore volume) suitable for satisfying the requirements should be used in the manufacture of the electrode.

Unfortunately, however, catalysts having the necessary physical properties (hereinafter, referred to "target physical features") are not always commercially available. However, in reality, it is impractical to directly manufacture catalysts having the target physical features. That is, repeatedly reproducing catalysts having uniform target physical features is not only very difficult in view of the present level of technical capability, and it is not possible to mass-produce such a customized catalyst, which is not desirable in terms of economy.

DISCLOSURE

Technical Problem

Therefore, the present disclosure relates to a mixed catalyst that is capable of preventing problems caused by limitations and disadvantages of the related technology as described above, a method of preparing the same, a method for forming an electrode using the same, and a membrane-electrode assembly including the same.

It is one object of the present disclosure to provide a mixed catalyst that has uniform physical properties within a predetermined range suitable for the manufacture of electrodes and membrane-electrode assemblies having desired performance and durability.

It is another object of the present disclosure to provide a method of preparing a mixed catalyst that has uniform physical properties within a predetermined range suitable for the manufacture of electrodes and membrane-electrode assemblies having desired performance and durability.

It is another object of the present disclosure to provide a method of forming an electrode having desired performance and durability using a mixed catalyst that has uniform physical properties within a predetermined range.

It is another object of the present disclosure to provide a membrane-electrode assembly having desired performance and durability due to the inclusion of a mixed catalyst that has uniform physical properties within a predetermined range.

In addition to the objects of the present disclosure described above, other features and advantages of the present disclosure will be described in the following detailed description, or will be more clearly understood by those skilled in the art to which the present disclosure pertains.

Technical Solution

In accordance with one aspect of the present disclosure, provided is a mixed catalyst for a fuel cell including a first catalyst including a first support and first catalytic metal particles dispersed on the first support, the first catalyst having a first BET surface area and a first total pore volume, and a second catalyst including a second support and second catalytic metal particles dispersed on the second support, the second catalyst having a second BET surface area different from the first BET surface area and a second total pore volume different from the first total pore volume, wherein the first and second catalysts are each independently (i) a first-type catalyst having a BET surface area of 150 $m^2/g$ or more and a total pore volume of 0.50 $cm^3/g$ or more, or (ii) a second-type catalyst having a BET surface area of less than 150 $m^2/g$ and a total pore volume of less than 0.50 $cm^3/g$, wherein (a) when the first and second catalysts are catalysts of the same type, the first and second catalysts are mixed in the mixed catalyst such that any sample taken from the mixed catalyst satisfies the following Equations 1 to 6, and (b) when the first and second catalysts are catalysts of different types, the first and second catalysts are mixed in the mixed catalyst such that any sample taken from the mixed catalyst satisfies the following Equations 7 to 12:

$$S_{BET\_C1} \cdot R_{C1} + S_{BET\_C2} \cdot R_{C2} \leq S_{BET\_HC} \leq (S_{BET\_C1} \cdot R_{C1} + S_{BET\_C2} \cdot R_{C2}) \cdot 1.25 \quad \text{[Equation 1]}$$

$$(S_{MICRO\_C1} \cdot R_{C1} + S_{MICRO\_C2} \cdot R_{C2}) \cdot 0.75 \leq S_{MICRO\_HC} \leq S_{MICRO\_C1} \cdot R_{C1} + S_{MICRO\_C2} \cdot R_{C2} \quad \text{[Equation 2]}$$

$$S_{EX\_C1} \cdot R_{C1} + S_{EX\_C2} \cdot R_{C2} \leq S_{EX\_HC} \leq (S_{EX\_C1} \cdot R_{C1} + S_{EX\_C2} \cdot R_{C2}) \cdot 1.25 \quad \text{[Equation 3]}$$

$$V_{T\_C1} \cdot R_{C1} + V_{T\_C2} \cdot R_{C2} \leq V_{T\_HC} \leq (V_{T\_C1} \cdot R_{C1} + V_{T\_C2} \cdot R_{C2}) \cdot 1.15 \quad \text{[Equation 4]}$$

$$(V_{MICRO\_C1} \cdot R_{C1} + V_{MICRO\_C2} \cdot R_{C2}) \cdot 0.85 \leq V_{MICRO\_HC} \leq V_{MICRO\_C1} \cdot R_{C1} + V_{MICRO\_C2} \cdot R_{C2} \quad \text{[Equation 5]}$$

$$V_{MESO\_C1} \cdot R_{C1} + V_{MESO\_C2} \cdot R_{C2} \leq V_{MESO\_HC} \leq (V_{MESO\_C1} \cdot R_{C1} + V_{MESO\_C2} \cdot R_{C2}) \cdot 1.15 \quad \text{[Equation 6]}$$

$$(S_{BET\_C1} \cdot R_{C1} + S_{BET\_C2} \cdot R_{C2}) \cdot 0.75 \leq S_{BET\_HC} \leq (S_{BET\_C1} \cdot R_{C1} + S_{BET\_C2} \cdot R_{C2}) \cdot 1.25 \quad \text{[Equation 7]}$$

$$(S_{MICRO\_C1} \cdot R_{C1} + S_{MICRO\_C2} \cdot R_{C2}) \cdot 0.75 \leq S_{MICRO\_HC} \leq (S_{MICRO\_C1} \cdot R_{C1} + S_{MICRO\_C2} \cdot R_{C2}) \cdot 1.25 \quad \text{[Equation 8]}$$

$$(S_{EX\_C1} \cdot R_{C1} + S_{EX\_C2} \cdot R_{C2}) \cdot 0.75 \leq S_{EX\_HC} \leq (S_{EX\_C1} \cdot R_{C1} + S_{EX\_C2} \cdot R_{C2}) \cdot 1.25 \quad \text{[Equation 9]}$$

$$(V_{T\_C1} \cdot R_{C1} + V_{T\_C2} \cdot R_{C2}) \cdot 0.85 \leq V_{T\_HC} \leq (V_{T\_C1} \cdot R_{C1} + V_{T\_C2} \cdot R_{C2}) \cdot 1.15 \quad \text{[Equation 10]}$$

$$(V_{MICRO\_C1} \cdot R_{C1} + V_{MICRO\_C2} \cdot R_{C2}) \cdot 0.85 \leq V_{MICRO\_HC} \leq (V_{MICRO\_C1} \cdot R_{C1} + V_{MICRO\_C2} \cdot R_{C2}) \cdot 1.15 \quad \text{[Equation 11]}$$

$$(V_{MESO\_C1} \cdot R_{C1} + V_{MESO\_C2} \cdot R_{C2}) \cdot 0.85 \leq V_{MESO\_HC} \leq (V_{MESO\_C1} \cdot R_{C1} + V_{MESO\_C2} \cdot R_{C2}) \cdot 1.15 \quad \text{[Equation 12]}$$

wherein $S_{BET\_HC}$ is a BET surface area of the mixed catalyst, $S_{BET\_C1}$ is the first BET surface area, $S_{BET\_C2}$ is the second BET surface area, $R_{C1}$ is a ratio of a weight of the first catalyst to a weight of the mixed catalyst, $R_{C2}$ is a ratio of a weight of the second catalyst to the weight of the mixed catalyst, $S_{MICRO\_HC}$ is a micropore surface area of the mixed catalyst, $S_{MICRO\_C1}$ is a micropore surface area of the first catalyst, $S_{MICRO\_C2}$ is a micropore surface area of the second catalyst, $S_{EX\_HC}$ is an external surface area of the mixed catalyst, $S_{EX\_C1}$ is an external surface area of the first catalyst, $S_{EX\_C2}$ is an external surface area of the second catalyst, $V_{T\_HC}$ is a total pore volume of the mixed catalyst, $V_{T\_C1}$ is the first total pore volume, $V_{T\_C2}$ is the second total pore volume, $V_{MICRO\_HC}$ is a micropore volume of the mixed catalyst, $V_{MICRO\_C1}$ is a micropore volume of the first catalyst, $V_{MICRO\_C2}$ is a micropore volume of the second catalyst, $V_{MESO\_HC}$ is a mesopore volume of the mixed catalyst, $V_{MESO\_C1}$ is a mesopore volume of the first catalyst, and $V_{MESO\_C2}$ is a mesopore volume of the second catalyst.

When any physical property selected from the group consisting of the BET surface area ($S_{BET\_HC}$), micropore surface area ($S_{MICRO\_HC}$), external surface area ($S_{EX\_HC}$), total pore volume ($V_{T\_HC}$), micropore volume ($V_{MICRO\_HC}$), and mesopore volume ($V_{MESO\_HC}$) is measured for each of five or more samples taken from the mixed catalyst, a standard deviation of the physical property may be not more than 5% of an arithmetic average of the physical property.

The first and second supports may have a shape selected from the group consisting of a spherical shape, a polyhedral shape, a linear shape, a tubular shape, and a planar shape, and the shape of the first support may be the same as that of the second support.

Each of the first and second catalytic metal particles may include platinum or a platinum-based alloy.

The first and second catalytic metal particles may be the same material.

In another aspect of the present disclosure, provided is a method of preparing a mixed catalyst for a fuel cell having a target BET surface area, a target micropore surface area, a target external surface area, a target total pore volume, a target micropore volume, and a target mesopore volume, the method including a first step of determining a first catalyst including a first support and first catalytic metal particles dispersed on the first support, the first catalyst having a first BET surface area and a first total pore volume, a second step of determining a second catalyst including a second support and second catalytic metal particles dispersed on the second support, the second catalyst having a second BET surface area different from the first BET surface area and a second total pore volume different from the first total pore volume, a third step of determining a mixing ratio of the first and second catalysts, and a fourth step of mixing the first catalyst with the second catalyst at the mixing ratio using a resonant acoustic mixer, wherein the first and second catalysts are each independently (i) a first-type catalyst having a BET surface area of 150 m²/g or more and a total pore volume of 0.50 cm³/g or more, or (ii) a second-type catalyst having a BET surface area of less than 150 m²/g and a total pore volume of less than 0.50 cm³/g, wherein (a) when the first and second catalysts are catalysts of the same type, the first, second and third steps are performed such that the following Equations 13 to 18 are satisfied, and (b) when the first and second catalysts are catalysts of different types, the first, second and third steps are performed such that the following Equations 19 to 24 are satisfied:

$$S_{BET\_C1} \cdot R_{C1} + S_{BET\_C2} \cdot R_{C2} \leq TS_{BET\_HC} \leq (S_{BET\_C1} \cdot R_{C1} + S_{BET\_C2} \cdot R_{C2}) \cdot 1.25 \quad \text{[Equation 13]}$$

$$(S_{MICRO\_C1} \cdot R_{C1} + S_{MICRO\_C2} \cdot R_{C2}) \cdot 0.75 \leq TS_{MICRO\_HC} \leq S_{MICRO\_C1} \cdot R_{C1} + S_{MICRO\_C2} \cdot R_{C2} \quad \text{[Equation 14]}$$

$$S_{EX\_C1} \cdot R_{C1} + S_{EX\_C2} \cdot R_{C2} \leq TS_{EX\_HC} \leq (S_{EX\_C1} \cdot R_{C1} + S_{EX\_C2} \cdot R_{C2}) \cdot 1.25 \quad \text{[Equation 15]}$$

$$V_{T\_C1} \cdot R_{C1} + V_{T\_C2} \cdot R_{C2} \leq TV_{T\_HC} \leq (V_{T\_C1} \cdot R_{C1} + V_{T\_C2} \cdot R_{C2}) \cdot 1.15 \quad \text{[Equation 16]}$$

$$(V_{MICRO\_C1} \cdot R_{C1} + V_{MICRO\_C2} \cdot R_{C2}) \cdot 0.85 \leq TV_{MICRO\_HC} \leq V_{MICRO\_C1} \cdot R_{C1} + V_{MICRO\_C2} \cdot R_{C2} \quad \text{[Equation 17]}$$

$$V_{MESO\_C1} \cdot R_{C1} + V_{MESO\_C2} \cdot R_{C2} \leq TV_{MESO\_HC} \leq (V_{MESO\_C1} \cdot R_{C1} + V_{MESO\_C2} \cdot R_{C2}) \cdot 1.15 \quad \text{[Equation 18]}$$

$$(S_{BET\_C1} \cdot R_{C1} + S_{BET\_C2} \cdot R_{C2}) \cdot 0.75 \leq TS_{BET\_HC} \leq (S_{BET\_C1} \cdot R_{C1} + S_{BET\_C2} \cdot R_{C2}) \cdot 1.25 \quad \text{[Equation 19]}$$

$$(S_{MICRO\_C1} \cdot R_{C1} + S_{MICRO\_C2} \cdot R_{C2}) \cdot 0.75 \leq TS_{MICRO\_HC} \leq (S_{MICRO\_C1} \cdot R_{C1} + S_{MICRO\_C2} \cdot R_{C2}) \cdot 1.25 \quad \text{[Equation 20]}$$

$$(S_{EX\_C1} \cdot R_{C1} + S_{EX\_C2} \cdot R_{C2}) \cdot 0.75 \leq TS_{EX\_HC} \leq (S_{EX\_C1} \cdot R_{C1} + S_{EX\_C2} \cdot R_{C2}) \cdot 1.25 \quad \text{[Equation 21]}$$

$$(V_{T\_C1} \cdot R_{C1} + V_{T\_C2} \cdot R_{C2}) \cdot 0.85 \leq TV_{T\_HC} \leq (V_{T\_C1} \cdot R_{C1} + V_{T\_C2} \cdot R_{C2}) \cdot 1.15 \quad \text{[Equation 22]}$$

$$(V_{MICRO\_C1} \cdot R_{C1} + V_{MICRO\_C2} \cdot R_{C2}) \cdot 0.85 \leq TV_{MICRO\_HC} \leq (V_{MICRO\_C1} \cdot R_{C1} + V_{MICRO\_C2} \cdot R_{C2}) \cdot 1.15 \quad \text{[Equation 23]}$$

$$(V_{MESO\_C1} \cdot R_{C1} + V_{MESO\_C2} \cdot R_{C2}) \cdot 0.85 \leq TV_{MESO\_HC} \leq (V_{MESO\_C1} \cdot R_{C1} + V_{MESO\_C2} \cdot R_{C2}) \cdot 1.15 \quad \text{[Equation 24]}$$

wherein $TS_{BET\_HC}$ is the target BET surface area,
$S_{BET\_C1}$ is the first BET surface area,
$S_{BET\_C2}$ is the second BET surface area,
$R_{C1}$ is a ratio of a weight of the first catalyst to a weight of the mixed catalyst,
$R_{C2}$ is a ratio of a weight of the second catalyst to the weight of the mixed catalyst (i.e., $R_{C2}=1-R_{C1}$),
$TS_{MICRO\_HC}$ is the target micropore surface area,
$S_{MICRO\_C1}$ is a micropore surface area of the first catalyst,
$S_{MICRO\_C2}$ is a micropore surface area of the second catalyst,
$TS_{EX\_HC}$ is the target external surface area,
$S_{EX\_C1}$ is an external surface area of the first catalyst,
$S_{EX\_C2}$ is an external surface area of the second catalyst,
$TV_{T\_HC}$ is the target total pore volume,
$V_{T\_C1}$ is the first total pore volume,
$V_{T\_C2}$ is the second total pore volume,
$TV_{MICRO\_HC}$ is the target micropore volume,
$V_{MICRO\_C1}$ is a micropore volume of the first catalyst,
$V_{MICRO\_C2}$ is a micropore volume of the second catalyst,
$TV_{MESO\_HC}$ is the target mesopore volume,
$V_{MESO\_C1}$ is a mesopore volume of the first catalyst, and
$V_{MESO\_C2}$ is a mesopore volume of the second catalyst.

The fourth step may be performed at a frequency of 55 to 65 Hz and an acceleration of 30 to 90 G for 1 to 20 minutes.

A mixture obtained through the fourth step may be a solid phase mixture.

The first and second supports may have a shape selected from the group consisting of a spherical shape, a polyhedral shape, a linear shape, a tubular shape, and a planar shape, and the shape of the first support may be the same as that of the second support.

Each of the first and second catalytic metal particles may include platinum or a platinum-based alloy.

The first and second catalytic metal particles may be the same material.

In another aspect of the present disclosure, provided is a method of forming an electrode on a polymer electrolyte membrane, the method including dispersing the mixed catalyst prepared according to the method for preparing a mixed catalyst along with an ionomer in a dispersion medium to prepare an electrode slurry, coating a substrate with the electrode slurry and drying the coated electrode slurry.

The substrate may be a release film, and the method of forming the electrode may further include transferring the electrode formed on the release film by drying onto the polymer electrolyte membrane, and removing the release film.

The substrate may be the polymer electrolyte membrane.

In another aspect of the present disclosure, provided is a membrane-electrode assembly including an anode, a cathode, and a polymer electrolyte membrane interposed between the anode and the cathode, wherein at least one selected from the group consisting of the anode and the cathode includes the mixed catalyst described above.

The general description of the present disclosure as provided above is only for illustration or description of the present disclosure, and does not limit the scope of the present disclosure.

Advantageous Effects of Invention

The present disclosure is capable of manufacturing an electrode having performance and durability that cannot be realized using only a single commercially available catalyst and a membrane-electrode assembly including the same.

Specifically, according to the present disclosure, by homogeneously mixing two or more types of commercially available catalysts without separate pretreatment, the resulting mixed catalyst can be imparted with uniform physical properties within a predetermined range, and as a result, electrodes and membrane-electrode assemblies having desired performance and durability can be repeatedly reproduced.

In addition, two or more types of commercially available solid phase catalysts are mixed without any separate treatment, thereby minimizing the change or loss of the first and second catalysts.

In addition, the type of source catalysts and mixing ratio thereof are determined based on the target physical features (that is, the physical properties of the mixed catalyst prepared according to the present disclosure are predictable), so various electrode designs suitable for situations and needs are possible.

BRIEF DESCRIPTION OF DRAWINGS

The accompanying drawings, which are provided for better understanding of the present disclosure and constitute a part of the present specification, are given to exemplify the embodiments of the present disclosure and describe the principles and features of the present disclosure with reference to the following detailed description, in which:

FIG. 1 is a graph showing BET isotherm curves of an A1 catalyst, a B1 catalyst and a mixed catalyst of Example 1a;

FIG. 2 is a graph showing BET isotherm curves of the A1 catalyst, the B1 catalyst and a mixed catalyst of Comparative Example 1a;

FIG. 3 is a graph showing BET isotherm curves of the A1 catalyst, the B1 catalyst and a mixed catalyst of Comparative Example 2a;

FIG. 6 is a graph showing XRD patterns of the A1 catalyst, the B1 catalyst and a mixed catalyst of Example 1a;

MODE FOR INVENTION

Hereinafter, the present disclosure will be described in more detail with reference to specific examples. However, the following examples are provided only for better understanding of the present disclosure, and should not be construed as limiting the scope of the present disclosure.

The mixed catalyst for a fuel cell of the present disclosure fundamentally includes commercially available first and second catalysts.

The first catalyst includes a first support and first catalytic metal particles dispersed on the first support, and the second catalyst includes a second support and second catalytic metal particles dispersed on the second support.

Each of the first and second supports may independently be (i) a carbon-based support, (ii) a porous inorganic oxide support such as zirconia, alumina, titania, silica, and ceria, or (iii) a zeolite support. The carbon-based support may be graphite, super P, carbon fiber, carbon sheet, carbon black, Ketjen black, Denka black, acetylene black, carbon nanotubes (CNTs), carbon spheres, carbon ribbon, fullerene, active carbon, carbon nanofibers, carbon nanowires, carbon nanoballs, carbon nanohorns, carbon nanocages, carbon nanorings, ordered nano-/meso-porous carbon, carbon aerogel, mesoporous carbon, graphene, stabilized carbon, activated carbon, or a combination of two or more thereof.

In an embodiment of the present disclosure, the first and second supports may have a shape selected from the group of a spherical shape, a polyhedral shape, a linear shape, a tubular shape, and a planar shape, and the shape of the first support may be the same as the shape of the second support.

When the shapes of the first and second supports are the same as or similar to each other, the uniformity of physical properties in the mixed catalyst produced in the same batch as well as the uniformity of physical properties between mixed catalysts produced in different batches can be further improved, but the present disclosure is not limited thereto.

The first and second catalytic metal particles may each independently include platinum or a platinum-based alloy.

The support-based alloy may be (i) a binary alloy such as Pt—Co, Pt—Pd, Pt—Mn, Pt—Sn, Pt—Mo, Pt—Cr, Pt—W, Pt—Ir, Pt—Ru, Pt—Ni, or Pt—Fe, (ii) a ternary alloy such as Pt—Ru—W, Pt—Ru—Ni, Pt—Ru—Mo, Pt—Ru—Ir, Pt—Co—Mn, Pt—Co—Ni, Pt—Co—Fe, Pt—Co—Ir, Pt—Co—S, Pt—Co—P, Pt—Fe—Ir, Pt—Fe—S, Pt—Fe—P, Pt—Au—Co, Pt—Au—Fe, Pt—Au—Ni, Pt—Ni—Ir, or Pt—Cr—Ir, or (iii) a quaternary alloy such as Pt—Ru—Rh—Ni, Pt—Ru—Sn—W or Pt—Ru—Ir—Ni, but is not limited thereto.

Optionally, the first and second catalytic metal particles may be the same material.

The first and second catalysts are different from each other in terms of BET surface area and total pore volume. That is, the first catalyst has a first BET surface area and a first total pore volume, and the second catalyst has a second BET surface area different from the first BET surface area and a second total pore volume different from the first total pore volume.

The physical properties of the mixed catalyst of the present disclosure, which is a mixture of first and second catalysts, which are different from each other, are different from the physical properties of the first catalyst, as well as the physical properties of the second catalyst. Accordingly, the mixed catalyst of the present disclosure enables the manufacture of an electrode having performance and durability that cannot be realized using only a commercially available single catalyst, and a membrane-electrode assembly including the same.

Commercially available catalysts can be broadly classified into two types. A first-type catalyst is a catalyst having a BET surface area of 150 m$^2$/g or more and a total pore volume of 0.50 cm$^3$/g or more, and a second-type catalyst has a BET surface area of less than 150 m$^2$/g and a total pore volume of less than 0.50 cm$^3$/g.

The first-type catalyst may be a catalyst supported on a porous support such as porous carbon, hollow carbon, highly durable/non-durable mesoporous carbon, or the like, having a large BET surface area and a large pore volume.

The second-type catalyst may be a catalyst supported on a solid support such as acetylene black or high-durability carbon, having a small BET surface area and a small pore volume.

The first and second catalysts included in the mixed catalyst of the present disclosure may each independently be the first-type catalyst or the second-type catalyst.

According to the present disclosure, when the first and second catalysts are catalysts of the same type (that is, both the first and second catalysts are first-type catalysts, or both the first and second catalysts are second-type catalysts), the first and second catalysts are mixed such that any sample taken from the mixed catalyst can satisfy the following Equations 1 to 6:

$$S_{BET\_C1} \cdot R_{C1} + S_{BET\_C2} \cdot R_{C2} \leq S_{BET\_HC} \leq (S_{BET\_C1} \cdot R_{C1} + S_{BET\_C2} \cdot R_{C2}) \cdot 1.25 \quad \text{[Equation 1]}$$

$$(S_{MICRO\_C1} \cdot R_{C1} + S_{MICRO\_C2} \cdot R_{C2}) \cdot 0.75 \leq S_{MICRO\_HC} \leq S_{MICRO\_C1} \cdot R_{C1} + S_{MICRO\_C2} \cdot R_{C2} \quad \text{[Equation 2]}$$

$$S_{EX\_C1} \cdot R_{C1} + S_{EX\_C2} \cdot R_{C2} \leq S_{EX\_HC} \leq (S_{EX\_C1} \cdot R_{C1} + S_{EX\_C2} \cdot R_{C2}) \cdot 1.25 \quad \text{[Equation 3]}$$

$$V_{T\_C1} \cdot R_{C1} + V_{T\_C2} \cdot R_{C2} \leq V_{T\_HC} \leq (V_{T\_C1} \cdot R_{C1} + V_{T\_C2} \cdot R_{C2}) \cdot 1.15 \quad \text{[Equation 4]}$$

$$(V_{MICRO\_C1} \cdot R_{C1} + V_{MICRO\_C2} \cdot R_{C2}) \cdot 0.85 \leq V_{MICRO\_HC} \leq V_{MICRO\_C1} \cdot R_{C1} + V_{MICRO\_C2} \cdot R_{C2} \quad \text{[Equation 5]}$$

$$V_{MESO\_C1} \cdot R_{C1} + V_{MESO\_C2} \cdot R_{C2} \leq V_{MESO\_HC} \leq (V_{MESO\_C1} \cdot R_{C1} + V_{MESO\_C2} \cdot R_{C2}) \cdot 1.15 \quad \text{[Equation 6]}$$

wherein $S_{BET\_HC}$ is a BET surface area of the mixed catalyst, $S_{BET\_C1}$ is the first BET surface area, $S_{BET\_C2}$ is the second BET surface area, $R_{C1}$ is a ratio of a weight of the first catalyst to a weight of the mixed catalyst, $R_{C2}$ is a ratio of a weight of the second catalyst to the weight of the mixed catalyst (i.e., $R_{C2} = 1 - R_{C1}$), $S_{MICRO\_HC}$ is a micropore surface area of the mixed catalyst, $S_{MICRO\_C1}$ is a micropore surface area of the first catalyst, $S_{MICRO\_C2}$ is a micropore surface area of the second catalyst, $S_{EX\_HC}$ is an external surface area of the mixed catalyst, $S_{EX\_C1}$ is an external surface area of the first catalyst, $S_{EX\_C2}$ is an external surface area of the second catalyst, $V_{T\_HC}$ is a total pore volume of the mixed catalyst, $V_{T\_C1}$ is the first total pore volume, $V_{T\_C2}$ is the second total pore volume, $V_{MICRO\_HC}$ is a micropore volume of the mixed catalyst, $V_{MICRO\_C1}$ is a micropore volume of the first catalyst, $V_{MICRO\_C2}$ is a micropore volume of the second catalyst, $V_{MESO\_HC}$ is a mesopore volume of the mixed catalyst, $V_{MESO\_C1}$ is a mesopore volume of the first catalyst, and $V_{MESO\_C2}$ is a mesopore volume of the second catalyst.

On the other hand, when the first and second catalysts are catalysts of different types (that is, when one of the first and second catalysts is a first-type catalyst and the other is a second-type catalyst), the first and second catalysts are mixed such that any sample taken from the mixed catalyst can satisfy the following Equations 7 to 12:

$$(S_{BET\_C1} \cdot R_{C1} + S_{BET\_C2} \cdot R_{C2}) \cdot 0.75 \leq S_{BET\_HC} \leq (S_{BET\_C1} \cdot R_{C1} + S_{BET\_C2} \cdot R_{C2}) \cdot 1.25 \quad \text{[Equation 7]}$$

$$(S_{MICRO\_C1} \cdot R_{C1} + S_{MICRO\_C2} \cdot R_{C2}) \cdot 0.75 \leq S_{MICRO\_HC} \leq (S_{MICRO\_C1} \cdot R_{C1} + S_{MICRO\_C2} \cdot R_{C2}) \cdot 1.25 \quad \text{[Equation 8]}$$

$$(S_{EX\_C1} \cdot R_{C1} + S_{EX\_C2} \cdot R_{C2}) \cdot 0.75 \leq S_{EX\_HC} \leq (S_{EX\_C1} \cdot R_{C1} + S_{EX\_C2} \cdot R_{C2}) \cdot 1.25 \quad \text{[Equation 9]}$$

$$(V_{T\_C1} \cdot R_{C1} + V_{T\_C2} \cdot R_{C2}) \cdot 0.85 \leq V_{T\_HC} \leq (V_{T\_C1} \cdot R_{C1} + V_{T\_C2} \cdot R_{C2}) \cdot 1.15 \quad \text{[Equation 10]}$$

$$(V_{MICRO\_C1} \cdot R_{C1} + V_{MICRO\_C2} \cdot R_{C2}) \cdot 0.85 \leq V_{MICRO\_HC} \leq (V_{MICRO\_C1} \cdot R_{C1} + V_{MICRO\_C2} \cdot R_{C2}) \cdot 1.15 \quad \text{[Equation 11]}$$

$$(V_{MESO\_C1} \cdot R_{C1} + V_{MESO\_C2} \cdot R_{C2}) \cdot 0.85 \leq V_{MESO\_HC} \leq (V_{MESO\_C1} \cdot R_{C1} + V_{MESO\_C2} \cdot R_{C2}) \cdot 1.15 \quad \text{[Equation 12]}$$

The BET surface area, external surface area, micropore surface area, total pore volume, mesopore volume, and micropore volume are physical properties of the catalyst measured using a BET analyzer (Micromeritics, ASAP-2020). In the present disclosure, each of the physical properties is obtained by measuring the physical properties for each of five samples randomly taken from the catalyst and then calculating an arithmetic average of the measured values.

In accordance with the BET analysis, gas (generally nitrogen) is adsorbed onto the sample and then the physical properties of the sample are measured based on Brunauer-Emmett-Teller (BET) theory. Mesopores are pores having a pore diameter of 2 to 50 nm, and micropores are pores having a pore diameter of less than 2 nm.

The solid phase mixed catalyst of the present disclosure, which is prepared by homogeneously mixing two or more types of commercially available catalysts without separate pretreatment, enables repeated reproduction of an electrode and a membrane-electrode assembly having desired performance and durability, since any physical property selected from the group consisting of a BET surface area ($S_{BET\_HC}$), a micropore surface area ($S_{MICRO\_HC}$), an external surface area ($S_{EX\_HC}$), a total pore volume ($V_{T\_HC}$), a micropore volume ($V_{MICRO\_HC}$), and a mesopore volume ($V_{MESO\_HC}$) is uniform such that a standard deviation of the physical property is not more than 5% of the arithmetic average of the physical property.

Hereinafter, a method of preparing the mixed catalyst according to the present disclosure will be described in detail.

As described above, in order to manufacture a fuel cell and/or a membrane-electrode assembly capable of satisfying various requirements for each technical field or final product to which the fuel cell is applied, a catalyst having physical properties (i.e., physical properties such as BET surface area, micropore surface area, external surface area, total pore volume, micropore volume, and mesopore volume) suitable for the requirements should be used in the manufacture of the electrode.

When catalysts having the target physical features (i.e., target BET surface area, target micropore surface area, target external surface area, target total pore volume, target micropore volume, and target mesopore volume) required to satisfy specific requirements are commercially available, they can be purchased and used to manufacture electrodes and membrane-electrode assemblies. However, in many cases, there is a problem in which the physical properties of commercially available catalysts do not match the target physical features.

The present disclosure provides a method for easily and economically producing a customized mixed catalyst having uniform target physical features using commercially available catalysts.

A method of preparing a mixed catalyst for a fuel cell having a target BET surface area, a target micropore surface area, a target external surface area, a target total pore volume, a target micropore volume, and a target mesopore volume includes (i) a first step of determining a first catalyst, (ii) a second step of determining a second catalyst, (iii) a third step of determining a mixing ratio of the first and second catalysts, and (iv) a fourth step of mixing the first and second catalysts at the mixing ratio.

The first and second catalysts are commercially available catalysts, wherein the first catalyst includes a first support and first catalytic metal particles dispersed on the first support, and a second catalyst includes a second support and second catalytic metal particles dispersed on the second support.

The first and second supports, and the first and second catalytic metal particles have been described above, and thus repeated descriptions thereof will be omitted.

The first and second catalysts are different from each other in terms of BET surface area and total pore volume. That is, the first catalyst has a first BET surface area and a first total pore volume, and the second catalyst has a second BET surface area different from the first BET surface area and a second total pore volume different from the first total pore volume.

According to the method of the present disclosure, by mixing the first and second catalysts, which are different from each other in terms of BET surface area and total pore volume, at a predetermined mixing ratio, a mixed catalyst having uniform third physical properties corresponding to the target physical features can be repeatedly reproduced. As a result, an electrode having performance and durability that cannot be realized using only a commercially available single catalyst and a membrane-electrode assembly including the same can be manufactured.

As described above, the commercially available first and second catalysts are each independently (i) a first-type catalyst having a BET surface area of 150 m$^2$/g or more and a total pore volume of 0.50 cm$^3$/g or more, or (ii) a second-type catalyst having a BET surface area of less than 150 m$^2$/g and a total pore volume of less than 0.50 cm$^3$/g.

According to the present disclosure, when the first and second catalysts are determined to be catalysts of the same type in the first and second steps (i.e., in the steps of determining the first and second catalysts) (i.e., when both the first and second catalysts are determined to be first type-catalysts, or when both the first and second catalysts are determined to be second-type catalysts), the first, second, and third steps (that is, the steps of determining the first catalyst, the second catalyst and the mixing ratio) are performed such that the following Equations 13 to 18 are satisfied.

$$S_{BET\_C1} \cdot R_{C1} + S_{BET\_C2} \cdot R_{C2} \leq TS_{BET\_HC} \leq (S_{BET\_C1} \cdot R_{C1} + S_{BET\_C2} \cdot R_{C2}) \cdot 1.25 \quad \text{[Equation 13]}$$

$$(S_{MICRO\_C1} \cdot R_{C1} + S_{MICRO\_C2} \cdot R_{C2}) \cdot 0.75 \leq TS_{MICRO\_HC} \leq S_{MICRO\_C1} \cdot R_{C1} + S_{MICRO\_C2} \cdot R_{C2} \quad \text{[Equation 14]}$$

$$S_{EX\_C1} \cdot R_{C1} + S_{EX\_C2} \cdot R_{C2} \leq TS_{EX\_HC} \leq (S_{EX\_C1} \cdot R_{C1} + S_{EX\_C2} \cdot R_{C2}) \cdot 1.25 \quad \text{[Equation 15]}$$

$$V_{T\_C1} \cdot R_{C1} + V_{T\_C2} \cdot R_{C2} \leq TV_{T\_HC} \leq (V_{T\_C1} \cdot R_{C1} + V_{T\_C2} \cdot R_{C2}) \cdot 1.15 \quad \text{[Equation 16]}$$

$$(V_{MICRO\_C1} \cdot R_{C1} + V_{MICRO\_C2} \cdot R_{C2}) \cdot 0.85 \leq TV_{MICRO\_HC} \leq V_{MICRO\_C1} \cdot R_{C1} + V_{MICRO\_C2} \cdot R_{C2} \quad \text{[Equation 17]}$$

$$V_{MESO\_C1} \cdot R_{C1} + V_{MESO\_C2} \cdot R_{C2} \leq TV_{MESO\_HC} \leq (V_{MESO\_C1} \cdot R_{C1} + V_{MESO\_C2} \cdot R_{C2}) \cdot 1.15 \quad \text{[Equation 18]}$$

wherein $TS_{BET\_HC}$ is the target BET surface area,
$S_{BET\_C1}$ is the first BET surface area,
$S_{BET\_C2}$ is the second BET surface area,
$R_{C1}$ is a ratio of a weight of the first catalyst to a weight of the mixed catalyst,
$R_{C2}$ is a ratio of a weight of the second catalyst to the weight of the mixed catalyst (i.e., $R_{C2}=1-R_{C1}$),
$TS_{MICRO\_HC}$ is the target micropore surface area,
$S_{MICRO\_C1}$ is a micropore surface area of the first catalyst,
$S_{MICRO\_C2}$ is a micropore surface area of the second catalyst,
$TS_{EX\_HC}$ is the target external surface area,
$S_{EX\_C1}$ is an external surface area of the first catalyst,
$S_{EX\_C2}$ is an external surface area of the second catalyst,
$TV_{T\_HC}$ is the target total pore volume,
$V_{T\_C1}$ is the first total pore volume,
$V_{T\_C2}$ is the second total pore volume,
$TV_{MICRO\_HC}$ is the target micropore volume,
$V_{MICRO\_C1}$ is a micropore volume of the first catalyst,
$V_{MICRO\_C2}$ is a micropore volume of the second catalyst,
$TV_{MESO\_HC}$ is the target mesopore volume,
$V_{MESO\_C1}$ is a mesopore volume of the first catalyst, and
$V_{MESO\_C2}$ is a mesopore volume of the second catalyst.

On the other hand, when the first and second catalysts are determined to be catalysts of different types in the first and second steps (i.e., in the steps of determining the first and second catalysts) (i.e., when one of the first and second catalysts is determined to be a first-type catalyst and the other of the first and second catalysts is determined to be a second-type catalyst), the first, second, and third steps (that is, the steps of determining the first catalyst, the second catalyst, and the mixing ratio) are performed such that the following Equations 19 to 24 are satisfied.

$$(S_{BET\_C1} \cdot R_{C1} + S_{BET\_C2} \cdot R_{C2}) \cdot 0.75 \leq TS_{BET\_HC} \leq (S_{BET\_C1} \cdot R_{C1} + S_{BET\_C2} \cdot R_{C2}) \cdot 1.25$$ [Equation 19]

$$(S_{MICRO\_C1} \cdot R_{C1} + S_{MICRO\_C2} \cdot R_{C2}) \cdot 0.75 \leq TS_{MICRO\_HC} \leq (S_{MICRO\_C1} \cdot R_{C1} + S_{MICRO\_C2} \cdot R_{C2}) \cdot 1.25$$ [Equation 20]

$$(S_{EX\_C1} \cdot R_{C1} + S_{EX\_C2} \cdot R_{C2}) \cdot 0.75 \leq TS_{EX\_HC} \leq (S_{EX\_C1} \cdot R_{C1} + S_{EX\_C2} \cdot R_{C2}) \cdot 1.25$$ [Equation 21]

$$(V_{T\_C1} \cdot R_{C1} + V_{T\_C2} \cdot R_{C2}) \cdot 0.85 \leq TV_{T\_HC} \leq (V_{T\_C1} \cdot R_{C1} + V_{T\_C2} \cdot R_{C2}) \cdot 1.15$$ [Equation 22]

$$(V_{MICRO\_C1} \cdot R_{C1} + V_{MICRO\_C2} \cdot R_{C2}) \cdot 0.85 \leq TV_{MICRO\_HC} \leq (V_{MICRO\_C1} \cdot R_{C1} + V_{MICRO\_C2} \cdot R_{C2}) \cdot 1.15$$ [Equation 23]

$$(V_{MESO\_C1} \cdot R_{C1} + V_{MESO\_C2} \cdot R_{C2}) \cdot 0.85 \leq TV_{MESO\_HC} \leq (V_{MESO\_C1} \cdot R_{C1} + V_{MESO\_C2} \cdot R_{C2}) \cdot 1.15$$ [Equation 24]

According to the present disclosure, the types of the first and second catalysts and the mixing ratio thereof (i.e., RC1:RC2) are determined depending on the target physical features (that is, the physical properties of the mixed catalyst prepared according to the present disclosure can be predicted), so various electrode designs to suit the situation and requirements are possible.

Since the mixed catalyst prepared by the method of the present disclosure (i.e., the mixture obtained through the fourth step) is a solid phase catalyst and the commercially available solid phase first and second catalysts are merely mixed at the mixing ratio without separate treatment, the physical properties of the mixed catalyst can be appropriately, accurately, easily and economically adjusted to the target physical features while minimizing the change or loss of the first and second catalysts.

According to the present disclosure, the fourth step of mixing the first and second catalysts at the mixing ratio is performed using a resonant acoustic mixer.

In an embodiment of the present disclosure, the fourth step may be performed at a frequency of 55 to 65 Hz and an acceleration of 30 to 90 G for 1 to 20 minutes.

When acoustic energy of a frequency of less than 55 Hz is used, an acceleration of less than 30 G is applied, or the resonance acoustic mixing is performed only for a period of time shorter than 1 minute, a homogeneous mixed catalyst cannot be prepared. On the other hand, when acoustic energy of a frequency of more than 65 Hz is used, an acceleration of more than 90 G is applied, or the resonance acoustic mixing is performed for a period of time longer than 20 minutes, the catalyst is deformed.

The height of the mixing vessel in which the resonance acoustic mixing of the present disclosure is performed may be 1 to 3 times the length of the bottom surface (i.e. the diameter, or the maximum distance between any two points thereof). When the length is less than the height, the first and second catalysts cannot be completely uniformly mixed, and when the length exceeds 3 times the height, the mixing vessel may be separated or damaged during mixing.

General mixing, such as simple mixing, vortex mixing, and ball-mill mixing, has limitations with regard to obtaining a homogeneous mixture, thus causing a great difference in physical properties between samples taken from mixtures obtained in a single batch and between samples taken from mixtures produced in different batches. This means that it is not possible to repeatedly reproduce a mixed catalyst having the desired target physical features. In particular, according to the ball-mill mixing, source catalysts are broken during the mixing process, so both the surface area and the pore volume of the mixed catalyst tend to be larger than those of the source catalysts, and the durability of the mixed catalyst is reduced due to physical damage to these source catalysts.

On the other hand, according to the present disclosure, by homogeneously mixing two or more types of commercially available catalysts using the resonant acoustic mixer, all of the mixed catalyst obtained in a single batch has uniform physical properties, and uniformity of physical properties between mixed catalysts produced in different batches can be improved.

For example, when any physical property selected from the group consisting of the BET surface area ($S_{BET\_HC}$), micropore surface area ($S_{MICRO\_HC}$), external surface area ($S_{EX\_HC}$), total pore volume ($V_{T\_HC}$), micropore volume ($V_{MICRO\_HC}$), and mesopore volume ($V_{MESO\_HC}$) is measured for samples taken from the mixed catalyst obtained in a single batch and samples taken from mixed catalysts produced in different batches, the measured physical property values are uniform, meaning that a standard deviation of the physical properties is not more than 5% of an arithmetic average of the physical properties.

In addition, since the resonance acoustic mixing of the present disclosure does not cause physical damage to the first and second catalysts, the mixed catalyst of the present disclosure, obtained through the resonance acoustic mixing of the first and second catalysts, can exhibit improved durability.

As a result, the method of the present disclosure is capable of repeatedly reproducing a mixed catalyst having uniform target physical features, and as a result, is capable of repeatedly reproducing an electrode and a membrane-electrode assembly having desired performance and durability using such a mixed catalyst.

Hereinafter, a method of forming an electrode using the mixed catalyst of the present disclosure will be described in detail.

First, the mixed catalyst prepared according to the present disclosure is dispersed in a dispersion medium together with an ionomer to prepare an electrode slurry.

The ionomer dispersed in the dispersion medium along with the mixed catalyst according to the present disclosure serves to transfer protons, and also serves as a binder for improving adhesion between the electrode and the polymer electrolyte membrane. The ionomer may be a fluorine-based ionomer or a hydrocarbon-based ionomer, and may have at least one ion-conducting group selected from the group consisting of a sulfonic acid group, a carboxyl group, a boronic acid group, a phosphoric acid group, an imide group, a sulfonimide group, a sulfonamide group, and a sulfonic fluoride group.

For example, the ionomer may be a fluorine-based ionomer such as poly(perfluorosulfonic acid) or poly(perfluorocarboxylic acid).

Alternatively, the ionomer may be a hydrocarbon-based polymer such as sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, or sulfonated polyarylene ether sulfone ketone.

The dispersion medium may be water, a hydrophilic solvent, an organic solvent, or a mixture of two or more thereof.

The hydrophilic solvent may be a compound containing, as a main chain, a linear or branched saturated or unsaturated hydrocarbon having 1 to 12 carbon atoms, and having at least one functional group selected from the group consisting of alcohols, ketones, aldehydes, carbonates, carboxylates, carboxylic acids, ethers, and amides.

The organic solvent may be N-methylpyrrolidone (NMP), dimethylsulfoxide (DMSO), tetrahydrofuran (THF), dimethylacetamide (DMAc), or a mixture of two or more thereof, but is not limited thereto.

Subsequently, the electrode slurry is coated on a substrate, and then the coated electrode slurry is dried.

In an embodiment of the present disclosure, the electrode may be formed on the polymer electrolyte membrane through a decal transfer method.

In accordance with the decal transfer method, the substrate on which the electrode slurry is coated is a release film, and the method of forming an electrode according to the present disclosure includes transferring an electrode formed on the release film to the polymer electrolyte membrane and removing the release film.

Specifically, the electrode slurry is coated to have a predetermined shape and size on the release film using a mask film, and then the dispersion medium is removed from the electrode slurry through a subsequent drying process. Subsequently, the release film and the electrode are stacked on the polymer electrolyte membrane so that the electrode formed through the drying process contacts the polymer electrolyte membrane, and are then hot-pressed to transfer the electrode onto the polymer electrolyte membrane, after which the release film is removed.

In the case of manufacturing a membrane-electrode assembly using a decal transfer method, generally, each of the anode and the cathode are formed on release films in the same manner as above, and the anode and the cathode are simultaneously transferred to one surface and the other surface of the polymer electrolyte membrane.

The polymer electrolyte membrane may be a single membrane type formed of an ionomer, or a reinforced composite membrane type including a porous support impregnated with an ionomer. The ionomer of the polymer electrolyte membrane and the ionomer of the electrode slurry are preferably the same kind of ionomers, but the present disclosure is not limited thereto, and different kinds of ionomers may be used in the manufacture of the polymer electrolyte membrane and the electrode.

In another embodiment of the present disclosure, the electrode may be formed on the polymer electrolyte membrane through a direct coating method.

In accordance with the direct coating method, the substrate on which the electrode slurry is coated is a polymer electrolyte membrane. For example, the electrode slurry is coated to a predetermined shape and size on the polymer electrolyte membrane using a mask film, and a drying process is performed to remove the dispersion medium from the electrode slurry. Subsequently, once the electrode is formed through the drying process, the mask film is removed.

When manufacturing a membrane-electrode assembly using a direct coating method, an anode and a cathode may be sequentially formed on one surface and the other surface of the polymer electrolyte membrane.

As described above, the membrane-electrode assembly (MEA) of the present disclosure can be manufactured by forming the anode and the cathode on one surface and the other surface, respectively, of the polymer electrolyte membrane through a decal transfer method or a direct coating method using the electrode slurry.

For example, the membrane-electrode assembly (MEA) of the present disclosure includes an anode, a cathode, and a polymer electrolyte membrane therebetween, wherein the anode may include the first mixed catalyst of the present disclosure, having target physical features capable of satisfying the performance and durability required therefor, whereas the cathode may include the second mixed catalyst of the present disclosure, having target physical features capable of satisfying the performance and durability required therefor.

Alternatively, only one of the anode and the cathode may contain the mixed catalyst prepared according to the present disclosure, and the other may contain a commercially available catalyst.

MODE FOR DISCLOSURE

Hereinafter, the present disclosure will be described in more detail with reference to specific examples. These examples are provided only for better understanding and should not be construed as limiting the scope of the present disclosure.

Example 1a (Resonant Acoustic Mixing of Catalysts of Different Types)

Commercially available A-type catalyst ($S_{BET}$=294 m²/g, $S_{MICRO}$=40 m²/g, $S_{EX}$=254 m²/g, $V_T$=0.81 cm³/g, $V_{MICRO}$=0.02 cm³/g, $V_{MESO}$=0.79 cm³/g)(hereinafter, referred to as "A1 catalyst") and B-type catalyst ($S_{BET}$=73 m²/g, $S_{MICRO}$=1 m²/g, $S_{EX}$=72 m²/g, $V_T$=0.35 cm³/g, $V_{MICRO}$=0 cm³/g, $V_{MESO}$=0.35 cm³/g) (hereinafter, referred to as "B1 catalyst") were each prepared. Here, "A-type catalyst" refers to a catalyst having a BET specific surface area of 150 m²/g or more and a total pore volume of 0.50 cm³/g or more, and "B-type catalyst" refers to a catalyst having a BET specific surface area of less than 150 m²/g and a total pore volume of less than 0.50 cm³/g.

Subsequently, 5 g of the A1 catalyst and 5 g of the B1 catalyst were injected into a mixing vessel (at a mixing ratio of 1:1), and this mixing vessel was mounted on a resonance acoustic mixer. Then, resonance acoustic mixing was performed under a frequency of 60 Hz and an acceleration of 70 G for 8 minutes to obtain a mixed catalyst.

Example 1b

A mixed catalyst was obtained in the same manner as in Example 1a in another batch.

Example 1c

A mixed catalyst was obtained in the same manner as in Example 1a, except that the mixing ratio of the A1 catalyst to the B1 catalyst (A1:B1) was 3:7.

Example 2 (Resonant Acoustic Mixing of A-Type Catalysts)

A mixed catalyst was obtained in the same manner as in Example 1a, except that, instead of the B1 catalyst, another A-type catalyst ($S_{BET}$=305 m²/g, $S_{MICRO}$=52 m²/g, $S_{EX}$=253 m²/g, $V_T$=0.63 cm³/g, $V_{MICRO}$=0.02 cm³/g, $V_{MESO}$=0.61 cm³/g)(hereinafter, referred to as "A2 catalyst") was used.

Example 3 (Resonant Acoustic Mixing of B-Type Catalysts)

A mixed catalyst was obtained in the same manner as in Example 1a, except that, instead of the A1 catalyst, another B-type catalyst ($S_{BET}$=64 m²/g, $S_{MICRO}$=10 m²/g, $S_{EX}$=52 m²/g, $V_T$=0.32 cm³/g, $V_{MICRO}$=0.01 cm³/g, $V_{MESO}$=0.31 cm³/g) (hereinafter, referred to as "B2 catalyst") was used.

Comparative Example 1a (Vortex Mixing of Catalysts of Different Types)

A mixed catalyst was obtained in the same manner as in Example 1a, except that the mixing vessel containing the A1 catalyst and the B1 catalyst was mounted to a vortex mixer and vortex mixing was performed for 15 minutes.

Comparative Example 1b

A mixed catalyst was obtained in another batch in the same manner as in Comparative Example 1a.

Comparative Example 1c

A mixed catalyst was obtained in the same manner as in Comparative Example 1a, except that the mixing ratio (A1:B1) of the A1 catalyst to the B1 catalyst was 3:7.

Comparative Example 2a (Ball-Mill Mixing of Catalysts of Different Types)

A mixed catalyst was obtained in the same manner as in Example 1a, except that beads were placed into a mixing vessel containing the A1 catalyst and the B1 catalyst, the mixing vessel was mounted on a ball-mill mixer, and then ball-mill mixing was performed for 10 minutes.

Comparative Example 2b

A mixed catalyst was obtained in another batch in the same manner as in Comparative Example 2a.

Comparative Example 2c

A mixed catalyst was obtained in the same manner as in Comparative Example 2a, except that the mixing ratio (A1:B1) of the A1 catalyst to the B1 catalyst was 3:7.

Comparative Example 3 (Vortex Mixing of A-Type Catalysts)

A mixed catalyst was obtained in the same manner as in Example 2, except that the mixing vessel containing the A1 catalyst and the A2 catalyst was mounted in a vortex mixer and then vortex mixing was performed for 15 minutes.

Comparative Example 4 (Ball-Mill Mixing of A-Type Catalysts)

A mixed catalyst was obtained in the same manner as in Example 2, except that beads were placed into a mixing vessel containing the A1 catalyst and the A2 catalyst, and the mixing vessel was mounted on a ball-mill mixer and then ball-mill mixing was performed for 10 minutes.

Comparative Example 5 (Vortex Mixing of B-Type Catalysts)

A mixed catalyst was obtained in the same manner as in Example 3, except that the mixing vessel containing the B1 catalyst and the B2 catalyst was placed into a vortex mixer and then vortex mixing was performed for 15 minutes.

Comparative Example 6 (Ball-Mill Mixing of B-Type Catalysts)

A mixed catalyst was obtained in the same manner as in Example 3, except that beads were placed into a mixing vessel containing the B1 catalyst and the B2 catalyst, the mixing vessel was mounted on a ball-mill mixer, and then ball-mill mixing was performed for 10 minutes.

[BET Isotherm Curve]

BET isotherm curves of the mixed catalysts of Example 1a, Comparative Example 1a, Comparative Example 2a, Example 2, and Example 3 were each obtained using a BET analyzer (Micromeritics, ASAP-2020), and are shown in FIGS. 1 to 5.

Figure 1:
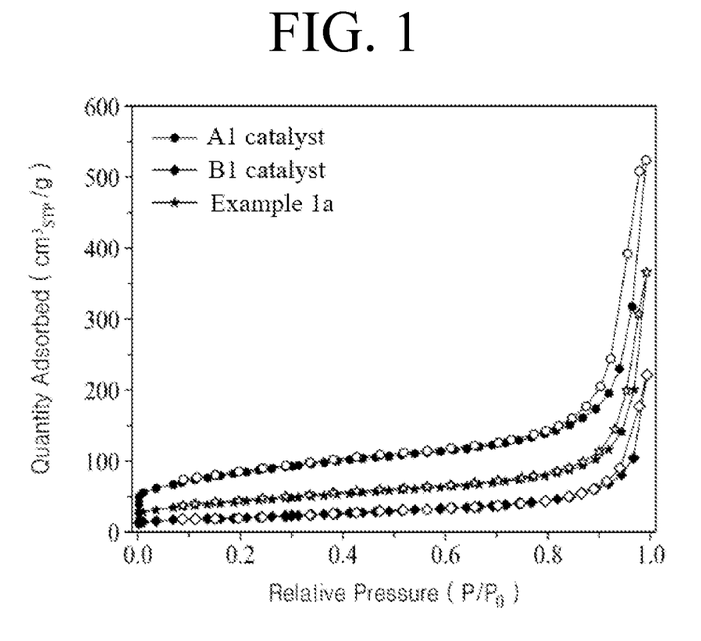

As can be seen from FIG. 1, showing the BET isotherm curves of the A1 catalyst, the B1 catalyst, and the mixed catalyst of Example 1a, the physical properties of the mixed catalyst of Example 1a, obtained by mixing the A1 catalyst with the B1 catalyst at a weight mixing ratio of 1:1 using resonant acoustic mixing, are controlled such that the isotherm curve is located almost in the middle of the BET isotherm curve of the A1 catalyst and the BET isotherm curve of the B1 catalyst.

Figure 2:
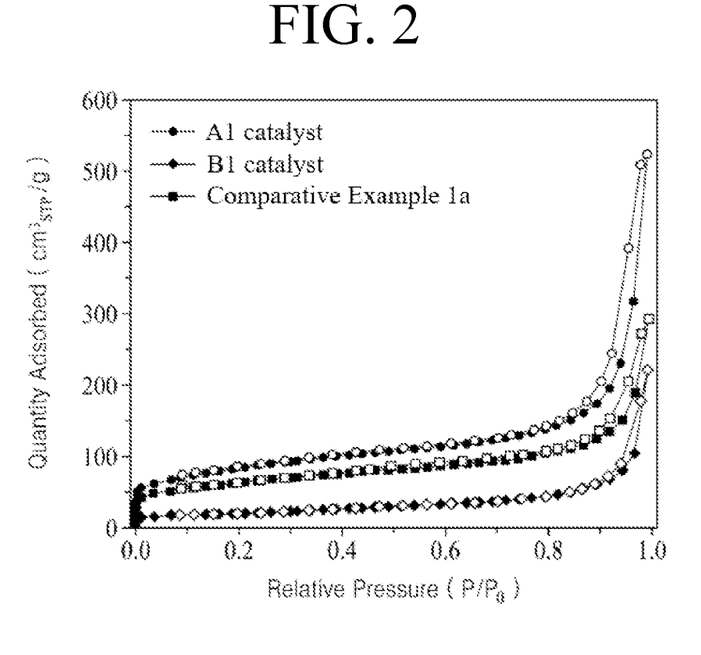

On the other hand, as can be seen from FIG. 2, showing BET isotherm curves of the A1 catalyst, the B1 catalyst, and the mixed catalyst of Comparative Example 1a, the mixed catalyst of Comparative Example 1a, obtained by mixing the A1 catalyst with the B1 catalyst at a weight mixing ratio of 1:1 using vortex mixing, exhibits a combination of the physical properties of the A1 catalyst and the physical properties of the B1 catalyst.

Figure 3:
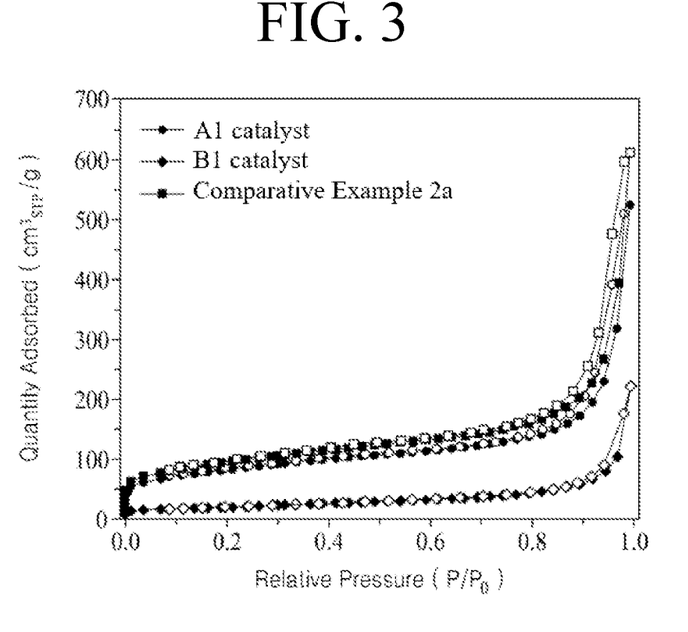

On the other hand, as can be seen from FIG. 3, showing the BET isotherm curves of the A1 catalyst, the B1 catalyst, and the mixed catalyst of Comparative Example 2a, the mixed catalyst of Comparative Example 2a, obtained by mixing the A1 catalyst with the B1 catalyst at a weight mixing ratio of 1:1 using ball-mill mixing, showed a tendency toward increased surface area and pore volume, unlike the mixed catalysts of Example 1a and Comparative Example 1a, which is considered to be due to physical damage to the catalysts during the ball-mill-mixing process.

Figure 4:
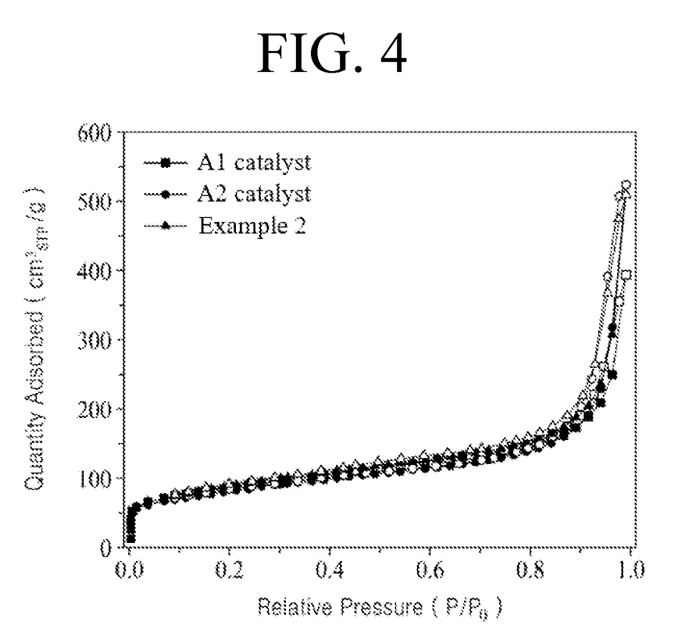
FIG. 4 is a graph showing BET isotherm curves of the A1 catalyst, an A2 catalyst and a mixed catalyst of Example 2.
Figure 5:
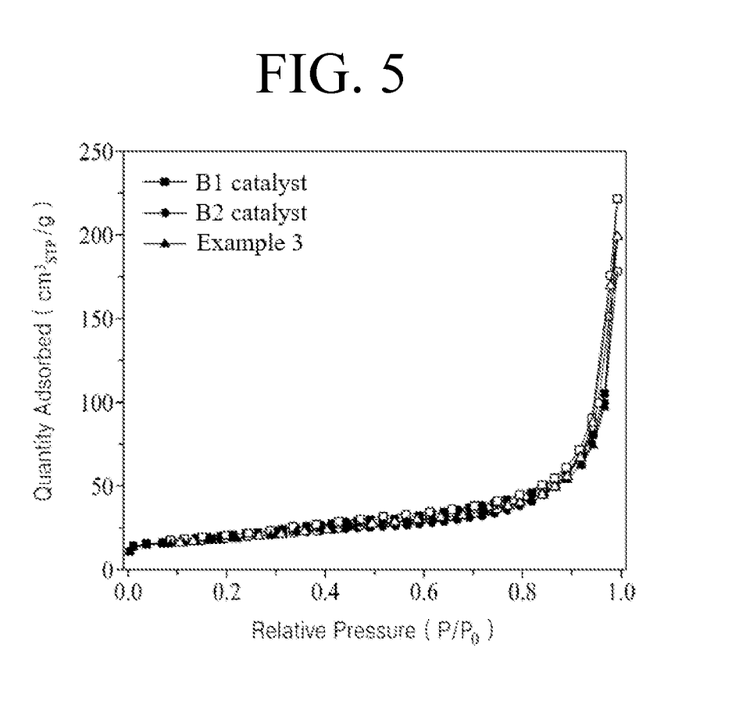
FIG. 5 is a graph showing BET isotherm curves of the B1 catalyst, a B2 catalyst and a mixed catalyst of Example 3.

As can be seen from FIG. 4, showing BET isotherm curves of the A1 catalyst, A2 catalyst, and the mixed catalyst of Example 2, and from FIG. 5, showing the BET isotherm curves of the B1 catalyst, B2 catalyst, and the mixed catalyst of Example 3, the mixed catalysts obtained by mixing catalysts of the same type at a weight mixing ratio of 1:1 using resonant acoustic mixing exhibit similar BET isotherm curves without a great difference from the source catalysts thereof.

[XRD Analysis]

Figure 6:
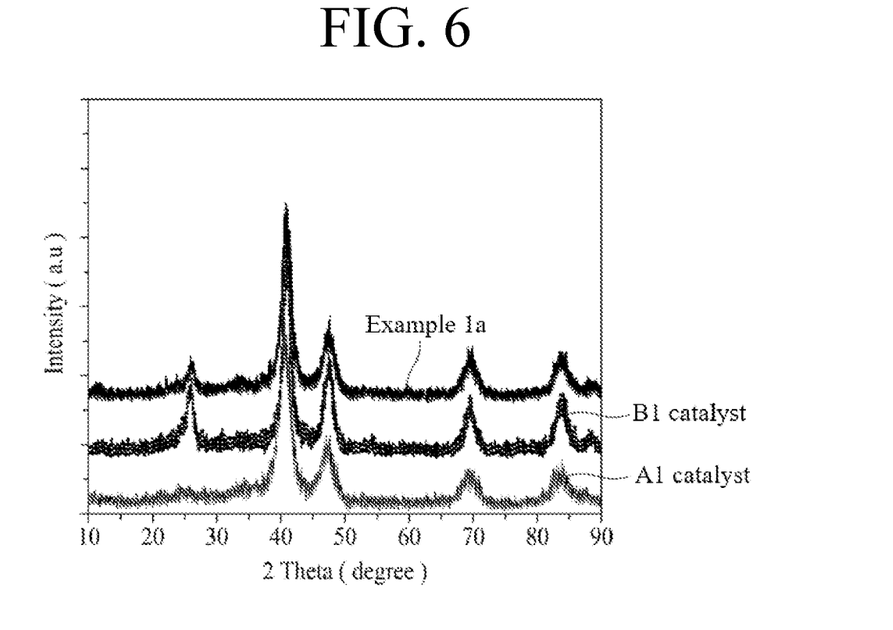
Figure 7:
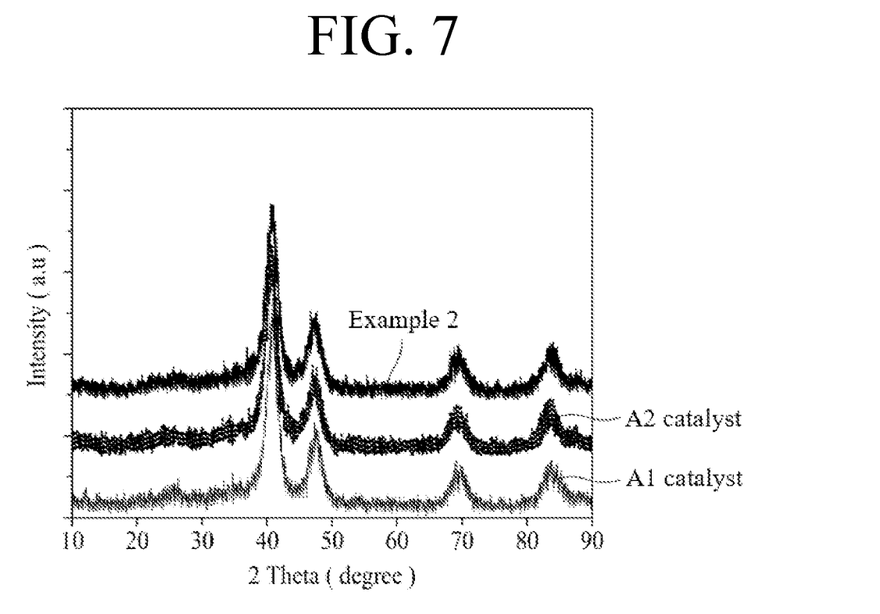
FIG. 7 is a graph showing XRD patterns of the A1 catalyst, the A2 catalyst and a mixed catalyst of Example 2.
Figure 8:
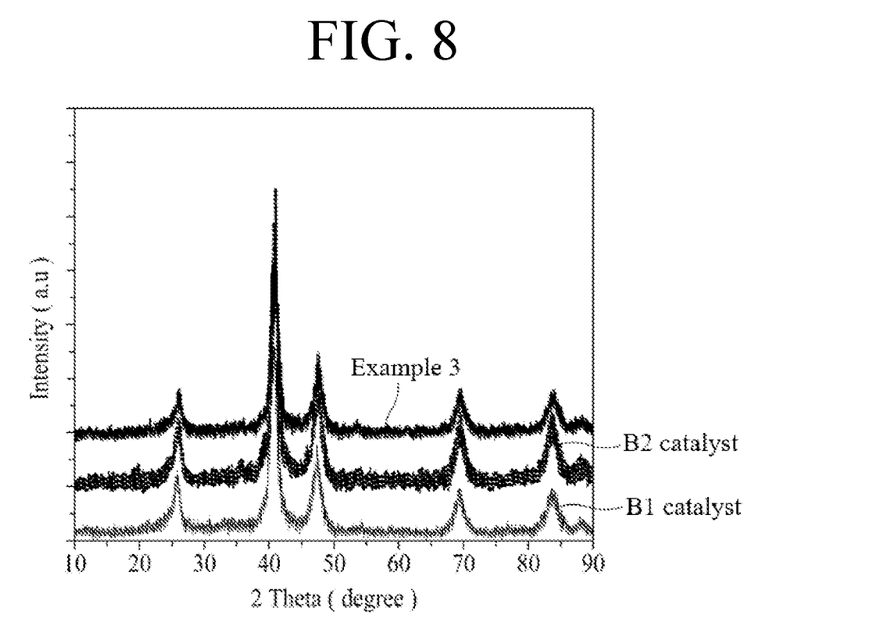
FIG. 8 is a graph showing XRD patterns of the B1 catalyst, the B2 catalyst and the mixed catalyst of Example 3.

The results of XRD analysis of the mixed catalysts of Examples 1a, 2, and 3 are shown in FIGS. 6 to 8, respectively.

As can be seen from FIG. 6, which is a graph showing the XRD patterns of the A1 catalyst, the B1 catalyst, and the mixed catalyst of Example 1a, the XRD peak intensity of the mixed catalyst of Example 1a was found to have a value between the peak intensity of the A1 catalyst and the peak intensity of the B1 catalyst similar to the result of a BET isotherm curve.

On the other hand, as can be seen from FIG. 7, which is a graph showing the XRD patterns of the A1 catalyst, the A2 catalyst, and the mixed catalyst of Example 2, and as can be seen from FIG. 8, which is a graph showing the XRD patterns of the B1 catalyst, the B2 catalyst, and the mixed catalyst of Example 3, the mixed catalysts, obtained by mixing catalysts of the same type at a weight mixing ratio of 1:1 using resonant acoustic mixing, exhibit similar XRD peak intensities without a remarkable difference from those of the source catalysts thereof. A slight decrease in carbon crystallinity was observed in the XRD pattern of the mixed catalyst of Example 3 obtained by resonant acoustic mixing of the B-type catalysts (i.e., the B1 catalyst and the B2 catalyst), there was no significant difference.

[Measurement of Physical Properties ($S_{BET}$, $S_{MICRO}$, $S_{EX}$, $V_T$, $V_{MICRO}$, $V_{MESO}$)]

The physical properties ($S_{BET}$, $S_{MICRO}$, $S_{EX}$, $V_T$, $V_{MICRO}$, $V_{MESO}$) of each of the mixed catalysts of Examples and Comparative Examples were measured using a BET analyzer (Micromeritics, ASAP-2020). Specifically, five samples were randomly selected from the mixed catalysts, the physical properties thereof were measured, and an average (arithmetic average, Avg.) and standard deviation (SD) of the measured values were calculated for each physical property.

The following Table 1 shows the physical properties of the mixed catalysts of Example 1a, Comparative Example 1a, and Comparative Example 2a, obtained by mixing catalysts of different types (i.e., A1 catalyst and B1 catalyst) at a mixing ratio of 1:1.

TABLE 1

|  | $S_{BET}$ (Avg.) (m²/g) | $S_{MICRO}$ (Avg.) (m²/g) | $S_{EX}$ (Avg.) (m²/g) | $V_T$ (Avg.) (cm³/g) | $V_{MICRO}$ (Avg.) (cm³/g) | $V_{MESO}$ (Avg.) (cm³/g) |
| --- | --- | --- | --- | --- | --- | --- |
| A1 catalyst | 294 | 40 | 254 | 0.81 | 0.02 | 0.79 |
| B1 catalyst | 73 | 1 | 72 | 0.35 | 0 | 0.35 |
| Ex. 1a | 153 | 18 | 140 | 0.58 | 0.01 | 0.57 |
| Comp. Ex. 1a | 235 | 30 | 195 | 0.71 | 0.02 | 0.69 |
| Comp. Ex. 2a | 323 | 43 | 280 | 0.83 | 0.03 | 0.80 |

As shown in Table 1, each of the surface area properties (that is, $S_{BET}$, $S_{MICRO}$, and $S_{EX}$) of the mixed catalyst of Example 1a, obtained by resonant acoustic mixing of catalysts of different types (i.e., A1 catalyst and B1 catalyst) at a mixing ratio of 1:1, is controlled within the range of "$(S_{\_A1} \cdot R_{A1} + S_{\_B1} \cdot R_{B1}) \cdot 0.75$ to $(S_{\_A1} \cdot R_{A1} + S_{\_B2} \cdot R_{B2}) \cdot 1.25$" (wherein $S_{\_A1}$ is the corresponding surface-area property of the A1 catalyst, $S_{\_B1}$ is the corresponding surface-area property of the B1 catalyst, $R_{A1}$ is the ratio of the weight of the A1 catalyst to the weight of the mixed catalyst, which is 0.5 in Example 1a, and RB1 is the ratio of the weight of the B1 catalyst to the weight of the mixed catalyst, which is 0.5 in Example 1a).

In addition, each of the pore volume properties (i.e., $V_T$, $V_{MICRO}$, and $V_{MESO}$) of the mixed catalyst of Example 1a is controlled within the range of "$(V_{\_A1} \cdot R_{A1} + V_{\_B1} \cdot R_{B1}) \cdot 0.85$ to $(V_{\_A1} \cdot R_{A1} + V_{\_B2} \cdot R_{B2}) \cdot 1.15$" (wherein $V_{\_A1}$ is the corresponding pore volume property of the A1 catalyst and $S_{\_B1}$ is the corresponding pore volume property of the B1 catalyst).

In contrast, some or all of the physical properties of the mixed catalysts of Comparative Examples 1a and 2a, obtained by vortex-mixing or ball-mill-mixing of the A1 catalyst with the B1 catalyst, deviated from the control range defined in the present disclosure.

The following Table 2 shows the average (Avg.) and standard deviation (SD) of the physical properties of each of the mixed catalysts of Example 1a, Comparative Example 1a, and Comparative Example 2a, obtained by mixing catalysts of different types (i.e., A1 catalyst and B1 catalyst) at a mixing ratio of 1:1, and the average (Avg.) and standard deviation (SD) of each of the physical properties of the mixed catalysts of Example 1b, Comparative Example 1b, and Comparative Example 2b, prepared in the same manner as the mixed catalysts in different batches therefrom.

TABLE 2

|  | $S_{BET}$ (m²/g) | | $S_{MICRO}$ (m²/g) | | $S_{EX}$ (m²/g) | | $V_T$ (cm³/g) | | $V_{MICRO}$ (cm³/g) | | $V_{MESO}$ (cm³/g) | |
| --- | --- | --- | --- | --- | --- | --- | --- | --- | --- | --- | --- | --- |
|  | Avg. | SD | Avg. | SD | Avg. | SD | Avg. | SD | Avg. | SD | Avg. | SD |
| Ex. 1a | 153 | 3.39 | 18 | 1.63 | 140 | 2.16 | 0.58 | 0 | 0.01 | 0.005 | 0.57 | 0.005 |
| Ex. 1b | 155 | 3.39 | 16 | 1.63 | 141 | 2.16 | 0.57 | 0 | 0.01 | 0.005 | 0.56 | 0.005 |
| Comp. Ex. 1a | 235 | 75.47 | 30 | 8.99 | 195 | 56.79 | 0.71 | 0.009 | 0.02 | 0.128 | 0.69 | 0.138 |
| Comp. Ex. 1b | 250 | 69.37 | 28 | 7.75 | 223 | 51.23 | 0.67 | 0.007 | 0.02 | 0.122 | 0.65 | 0.131 |
| Comp. Ex. 2a | 323 | 22.11 | 43 | 2.05 | 280 | 12.47 | 0.83 | 0.009 | 0.03 | 0.038 | 0.80 | 0.024 |
| Comp. Ex. 2b | 330 | 20.56 | 45 | 2.04 | 270 | 11.33 | 0.78 | 0.06 | 0.05 | 0.036 | 0.72 | 0.022 |

As can be seen from Table 2, the mixed catalysts of Examples 1a and 1b had uniform physical properties such that the standard deviation of each of the physical properties ($S_{BET}$, $S_{MICRO}$, $S_{EX}$, $V_T$, $V_{MICRO}$, $V_{MESO}$) was not more than 5% of the average. In addition, it can be seen that there was little difference in physical properties between the mixed catalysts of Examples 1a and 1b, each prepared in the same manner in different batches.

That is, it can be seen that the uniformity of the physical properties in the mixed catalyst prepared in the same batch as well as the uniformity of the physical properties between mixed catalysts prepared in different batches was also very excellent. As a result, according to the present disclosure, it is possible to repeatedly reproduce a mixed catalyst having uniform target physical features.

Meanwhile, the mixed catalysts of Comparative Examples 1a, 1b, 2a, and 2b, each prepared through vortex mixing or ball-mill mixing, instead of the resonance acoustic mixing of the present disclosure, have at least some physical properties ($S_{BET}$, $S_{MICRO}$, $S_{EX}$, $V_T$, $V_{MICRO}$, $V_{MESO}$) having a standard deviation exceeding 5% of the average thereof. In addition, remarkable differences in physical properties were observed between the mixed catalysts (i.e., between Comparative Examples 1a and 1b, and between Comparative Examples 2a and 2b) prepared in the same manner but in different batches. That is, it can be seen that the source catalysts (i.e., the A1 catalyst and the B1 catalyst) are not homogeneously mixed with the preparation methods of these comparative examples, so it is impossible to repeatedly reproduce mixed catalysts having uniform physical properties.

The following Table 3 shows the physical properties of the mixed catalysts of Example 2, Comparative Example 3, and Comparative Example 4, obtained by mixing different A-type catalysts (i.e., an A1 catalyst and an A2 catalyst) at a mixing ratio of 1:1, and the following Table 4 shows the physical properties of the mixed catalysts of Example 3, Comparative Example 5, and Comparative Example 6, obtained by mixing different B-type catalysts (i.e., a B1 catalyst and a B2 catalyst) at a mixing ratio of 1:1.

TABLE 3

|  | $S_{BET}$ (Avg.) (m²/g) | $S_{MICRO}$ (Avg.) (m²/g) | $S_{EX}$ (Avg.) (m²/g) | $V_T$ (Avg.) (cm³/g) | $V_{MICRO}$ (Avg.) (cm³/g) | $V_{MESO}$ (Avg.) (cm³/g) |
| --- | --- | --- | --- | --- | --- | --- |
| A1 catalyst | 294 | 40 | 254 | 0.81 | 0.02 | 0.79 |
| A2 catalyst | 305 | 52 | 253 | 0.63 | 0.02 | 0.61 |

TABLE 3-continued

| | $S_{BET}$ (Avg.) (m²/g) | $S_{MICRO}$ (Avg.) (m²/g) | $S_{EX}$ (Avg.) (m²/g) | $V_T$ (Avg.) (cm³/g) | $V_{MICRO}$ (Avg.) (cm³/g) | $V_{MESO}$ (Avg.) (cm³/g) |
|---|---|---|---|---|---|---|
| Ex. 2 | 318 | 42 | 275 | 0.79 | 0.02 | 0.77 |
| Comp. Ex. 3 | 270 | 50 | 250 | 0.68 | 0.02 | 0.66 |
| Comp. Ex. 4 | 380 | 59 | 336 | 0.84 | 0.04 | 0.81 |

TABLE 4

| | $S_{BET}$ (Avg.) (m²/g) | $S_{MICRO}$ (Avg.) (m²/g) | $S_{EX}$ (Avg.) (m²/g) | $V_T$ (Avg.) (cm³/g) | $V_{MICRO}$ (Avg.) (cm³/g) | $V_{MESO}$ (Avg.) (cm³/g) |
|---|---|---|---|---|---|---|
| B1 catalyst | 73 | 1 | 72 | 0.35 | 0 | 0.35 |
| B2 catalyst | 64 | 10 | 52 | 0.32 | 0.01 | 0.31 |
| Ex. 3 | 69 | 6 | 63 | 0.34 | 0 | 0.34 |
| Comp. Ex. 5 | 65 | 9 | 56 | 0.31 | 0.01 | 0.30 |
| Comp. Ex. 6 | 88 | 15 | 75 | 0.39 | 0.02 | 0.37 |

As shown in Tables 3 and 4, the mixed catalysts of Examples 2 and 3, obtained by resonant acoustic mixing of catalysts of the same type (i.e., an A1 catalyst and an A2 catalyst, or a B1 catalyst and a B2 catalyst) at a mixing ratio of 1:1 can be imparted with a BET surface area ($S_{BET}$) and an external surface area ($S_{EX}$) controlled within the range of "$S_{\_A1} \cdot R_{A1} + S_{\_A2} \cdot R_{A2}$" to "$(S_{\_A1} \cdot R_{A1} + S_{\_A2} \cdot R_{A2}) \cdot 1.25$" and "$(S_{\_B1} \cdot R_{B1} + S_{\_B2} \cdot R_{B2})$" to "$(S_{\_B1} \cdot R_{B1} + S_{\_B2} \cdot R_{B2}) \cdot 1.25$", respectively (wherein $S_{\_A1}$ is the corresponding surface-area property of the A1 catalyst, $S_{\_A2}$ is the corresponding surface-area property of the A2 catalyst, $S_{\_B1}$ is the corresponding surface-area property of the B1 catalyst, $S_{\_B2}$ is the corresponding surface-area property of the B2 catalyst, $R_{A1}$ is 0.5 as the ratio of the weight of the A1 catalyst to the weight of the mixed catalyst of Example 2, $R_{A2}$ is 0.5 as the ratio of the weight of the A2 catalyst to the weight of the mixed catalyst of Example 2, $R_{B1}$ is 0.5 as the ratio of the weight of the B1 catalyst to the weight of the mixed catalyst of Example 3, and $R_{B}2$ is 0.5 as the ratio of the weight of the B2 catalyst to the weight of the mixed catalyst of Example 3). In addition, the micropore surface areas ($S_{MICRO}$) of the mixed catalysts of Examples 2 and 3 are controlled within the ranges of "$(S_{MICRO\_A1} \cdot R_{A1} + S_{MICRO\_A2} \cdot R_{A2}) \cdot 0.75$ to $(S_{MICRO\_A1} \cdot R_{A1} + S_{MICRO\_A2} \cdot R_{A2})$" and "$(S_{MICRO\_B1} \cdot R_{B1} + S_{MICRO\_B2} \cdot R_{B2}) \cdot 0.75$ to $(S_{MICRO\_B1} \cdot R_{B1} + S_{MICRO\_B2} \cdot R_{B2})$", respectively (wherein $S_{MICRO\_A1}$ is the micropore surface area of the A1 catalyst, $S_{MICRO\_A2}$ is the micropore surface area of the A2 catalyst, $S_{MICRO\_B1}$ is the micropore surface area of the B1 catalyst, and $S_{MICRO\_B2}$ is the micropore surface area of the B2 catalyst).

The total pore volume ($V_T$) and mesopore volume ($V_{MESO}$) of the mixed catalyst of Example 2 and the total pore volume ($V_T$) and mesopore volume ($V_{MESO}$) of the mixed catalyst of Example 3 are controlled within the range of "$(V_{\_A1} \cdot R_{A1} + V_{\_A2} \cdot R_{A2})$" to "$(V_{\_A1} \cdot R_{A1} + V_{\_A2} \cdot R_{A2}) \cdot 1.15$" and the range of "$(V_{\_B1} \cdot R_{B1} + V_{\_B2} \cdot R_{B2})$" to "$(V_{\_B1} \cdot R_{B1} + V_{\_B2} \cdot R_{B2}) \cdot 1.15$" (wherein $V_{\_A1}$ is the corresponding pore volume property of the A1 catalyst, $V_{\_A2}$ is the corresponding pore volume property of the A2 catalyst, $V_{\_B1}$ is the corresponding pore volume property of the B1 catalyst, and $V_{\_B2}$ is the corresponding pore volume property of the B2 catalyst). In addition, the micropore surface areas ($V_{MICRO}$) of the mixed catalysts of Examples 2 and 3 are controlled within the ranges of "$(V_{MICRO\_A1} \cdot R_{A1} + V_{MICRO\_A2} \cdot R_{A2}) \cdot 0.85$ to $(V_{MICRO\_A1} \cdot R_{A1} + V_{MICRO\_A2} \cdot R_{A2})$" and "$(V_{MICRO\_B1} \cdot R_{B1} + V_{MICRO\_B2} \cdot R_{B2}) \cdot 0.85$ to $(V_{MICRO\_B1} \cdot R_{B1} + V_{MICRO\_B2} \cdot R_{B2})$", respectively (wherein $V_{MICRO\_A1}$ is the micropore volume of the A1 catalyst, $V_{MICRO\_A2}$ is the micropore volume of the A2 catalyst, $V_{MICRO\_B1}$ is the micropore volume of the B1 catalyst, and $V_{MICRO\_B2}$ is the micropore volume of the B2 catalyst).

The above results show that, as the resonant acoustic mixing of catalysts of the same type proceeds, the micropores decrease whereas other pores increase. In addition, although the case of mixing catalysts of the same type (Examples 2 and 3) is somewhat inferior to the case of mixing catalysts of different types (Example 1a) in terms of the diversity of mixed catalysts that can be produced, the physical properties of the mixed catalysts can be well controlled within a predetermined range according to the disclosure.

On the other hand, the mixed catalysts of Comparative Examples 3 to 6, obtained by vortex mixing or ball-mill mixing of catalysts of the same type (i.e., an A1 catalyst and an A2 catalyst, or a B1 catalyst and a B2 catalyst) have at least some physical properties deviating from the control range defined in the present disclosure.

The following Table 5 shows the physical properties of the mixed catalysts of Example 1c, Comparative Example 1c, and Comparative Example 2c, obtained by mixing catalysts of different types (i.e., A1 catalyst and B1 catalyst) at a mixing ratio of 3:7.

TABLE 5

| | $S_{BET}$ (Avg.) (m²/g) | $S_{MICRO}$ (Avg.) (m²/g) | $S_{EX}$ (Avg.) (m²/g) | $V_T$ (Avg.) (cm³/g) | $V_{MICRO}$ (Avg.) (cm³/g) | $V_{MESO}$ (Avg.) (cm³/g) |
|---|---|---|---|---|---|---|
| A1 catalyst | 294 | 40 | 254 | 0.81 | 0.02 | 0.79 |
| B1 catalyst | 73 | 1 | 72 | 0.35 | 0 | 0.35 |
| Ex. 1c | 133 | 10 | 126 | 0.48 | 0.01 | 0.47 |
| Comp. Ex. 1c | 170 | 25 | 160 | 0.61 | 0.01 | 0.60 |
| Comp. Ex. 2c | 230 | 35 | 190 | 0.60 | 0.02 | 0.58 |

As shown in Table 5, even when mixing the A1 catalyst and the B1 catalyst at a mixing ratio (i.e., 3:7) other than 1:1, only the mixed catalyst prepared according to the present disclosure exhibits a predetermined range of target physical features.

It can be seen that, unlike the resonance acoustic mixing of the present disclosure, vortex mixing and ball-mill mixing, for the mixed catalysts of the comparative examples, exhibiting random physical properties without a certain tendency, make it almost impossible to control the properties of the mixed catalyst to be produced (i.e. the physical properties of the mixed catalyst to be produced by vortex mixing or ball-mill mixing are unpredictable).

[Durability Evaluation of Mixed Catalyst]

The durability of each of the mixed catalysts of Example 1a, Comparative Example 1a, and Comparative Example 2a was evaluated in the following manner.

1 g of the mixed catalyst was wetted with water, and then a solution obtained by dispersing the mixed catalyst in a mixed solvent consisting of isopropyl alcohol and water mixed at a volume ratio of 7:3 was mixed with 40 g of a 10% ionomer solution. Then, the resulting mixture was dispersed using a homogeneous mixer to obtain an electrode slurry. Then, a membrane-electrode assembly was manufactured by a conventional method using the electrode slurry. The membrane-electrode assembly was subjected to 500 triangle sweep cycles (temperature: 80° C., relative humidity (anode/cathode): 100%/100%, scan rate: 500 mV/s) between 1.0V and 1.5V, voltage loss was measured at 1.5 A/cm², and the results are shown in Table 6 below.

TABLE 6

|  | Ex. 1a | Comp. Ex. 1a | Comp. Ex. 2a |
| --- | --- | --- | --- |
| Voltage loss after 500 cycles (@1.5 A/cm²) | 10 mV | 29 mV | 38 mV |

The Table 6 shows that only the Examples according to the present disclosure exhibit the effect of improving catalyst durability. On the other hand, Comparative Examples obtained through vortex mixing or ball-mill mixing exhibited deteriorated durability. In particular, Comparative Example 2a exhibited severely deteriorated durability of the mixed catalyst due to the physical damage caused to the source catalysts during the ball-mill mixing process.

The invention claimed is:

1. A mixed catalyst for a fuel cell comprising:
a first catalyst including a first support and first catalytic metal particles dispersed on the first support, the first catalyst having a first BET surface area and a first total pore volume; and
a second catalyst including a second support and second catalytic metal particles dispersed on the second support, the second catalyst having a second BET surface area different from the first BET surface area and a second total pore volume different from the first total pore volume,
wherein the first and second catalysts are each independently (i) a first-type catalyst having a BET surface area of 150 m²/g or more and a total pore volume of 0.50 cm³/g or more, or (ii) a second-type catalyst having a BET surface area of less than 150 m²/g and a total pore volume of less than 0.50 cm³/g,
wherein (a) when the first and second catalysts are catalysts of the same type, the first and second catalysts are mixed in the mixed catalyst such that any sample taken from the mixed catalyst satisfies the following Equations 1 to 6, and
(b) when the first and second catalysts are catalysts of different types, the first and second catalysts are mixed in the mixed catalyst such that any sample taken from the mixed catalyst satisfies the following Equations 7 to 12:

$$S_{BET\_C1} \cdot R_{C1} + S_{BET\_C2} \cdot R_{C2} \leq S_{BET\_HC} \leq (S_{BET\_C1} \cdot R_{C1} + S_{BET\_C2} \cdot R_{C2}) \cdot 1.25 \quad \text{[Equation 1]}$$

$$(S_{MICRO\_C1} \cdot R_{C1} + S_{MICRO\_C2} \cdot R_{C2}) \cdot 0.75 \leq S_{MICRO\_HC} \leq S_{MICRO\_C1} \cdot R_{C1} + S_{MICRO\_C2} \cdot R_{C2} \quad \text{[Equation 2]}$$

$$S_{EX\_C1} \cdot R_{C1} + S_{EX\_C2} \cdot R_{C2} \leq S_{EX\_HC} \leq (S_{EX\_C1} \cdot R_{C1} + S_{EX\_C2} \cdot R_{C2}) \cdot 1.25 \quad \text{[Equation 3]}$$

$$V_{T\_C1} \cdot R_{C1} + V_{T\_C2} \cdot R_{C2} \leq V_{T\_HC} \leq (V_{T\_C1} \cdot R_{C1} + V_{T\_C2} \cdot R_{C2}) \cdot 1.15 \quad \text{[Equation 4]}$$

$$(V_{MICRO\_C1} \cdot R_{C1} + V_{MICRO\_C2} \cdot R_{C2}) \cdot 0.85 \leq V_{MICRO\_HC} \leq V_{MICRO\_C1} \cdot R_{C1} + V_{MICRO\_C2} \cdot R_{C2} \quad \text{[Equation 5]}$$

$$V_{MESO\_C1} \cdot R_{C1} + V_{MESO\_C2} \cdot R_{C2} \leq V_{MESO\_HC} \leq (V_{MESO\_C1} \cdot R_{C1} + V_{MESO\_C2} \cdot R_{C2}) \cdot 1.15 \quad \text{[Equation 6]}$$

$$(S_{BET\_C1} \cdot R_{C1} + S_{BET\_C2} \cdot R_{C2}) \cdot 0.75 \leq S_{BET\_HC} \leq (S_{BET\_C1} \cdot R_{C1} + S_{BET\_C2} \cdot R_{C2}) \cdot 1.25 \quad \text{[Equation 7]}$$

$$(S_{MICRO\_C1} \cdot R_{C1} + S_{MICRO\_C2} \cdot R_{C2}) \cdot 0.75 \leq S_{MICRO\_HC} \leq (S_{MICRO\_C1} \cdot R_{C1} + S_{MICRO\_C2} \cdot R_{C2}) \cdot 1.25 \quad \text{[Equation 8]}$$

$$(S_{EX\_C1} \cdot R_{C1} + S_{EX\_C2} \cdot R_{C2}) \cdot 0.75 \leq S_{EX\_HC} \leq (S_{EX\_C1} \cdot R_{C1} + S_{EX\_C2} \cdot R_{C2}) \cdot 1.25 \quad \text{[Equation 9]}$$

$$(V_{T\_C1} \cdot R_{C1} + V_{T\_C2} \cdot R_{C2}) \cdot 0.85 \leq V_{T\_HC} \leq (V_{T\_C1} \cdot R_{C1} + V_{T\_C2} \cdot R_{C2}) \cdot 1.15 \quad \text{[Equation 10]}$$

$$(V_{MICRO\_C1} \cdot R_{C1} + V_{MICRO\_C2} \cdot R_{C2}) \cdot 0.85 \leq V_{MICRO\_HC} \leq (V_{MICRO\_C1} \cdot R_{C1} + V_{MICRO\_C2} \cdot R_{C2}) \cdot 1.15 \quad \text{[Equation 11]}$$

$$(V_{MESO\_C1} \cdot R_{C1} + V_{MESO\_C2} \cdot R_{C2}) \cdot 0.85 \leq V_{MESO\_HC} \leq (V_{MESO\_C1} \cdot R_{C1} + V_{MESO\_C2} \cdot R_{C2}) \cdot 1.15 \quad \text{[Equation 12]}$$

wherein $S_{BET\_HC}$ is a BET surface area of the mixed catalyst,
$S_{BET\_C1}$ is the first BET surface area,
$S_{BET\_C2}$ is the second BET surface area,
$R_{C1}$ is a ratio of a weight of the first catalyst to a weight of the mixed catalyst,
$R_{C2}$ is a ratio of a weight of the second catalyst to the weight of the mixed catalyst,
$S_{MICRO\_HC}$ is a micropore surface area of the mixed catalyst,
$S_{MICRO\_C1}$ is a micropore surface area of the first catalyst,
$S_{MICRO\_C2}$ is a micropore surface area of the second catalyst,
$S_{EX\_HC}$ is an external surface area of the mixed catalyst,
$S_{EX\_C1}$ is an external surface area of the first catalyst,
$S_{EX\_C2}$ is an external surface area of the second catalyst,
$V_{T\_HC}$ is a total pore volume of the mixed catalyst,
$V_{T\_C1}$ is the first total pore volume,
$V_{T\_C2}$ is the second total pore volume,
$V_{MICRO\_HC}$ is a micropore volume of the mixed catalyst,
$V_{MICRO\_C1}$ is a micropore volume of the first catalyst,
$V_{MICRO\_C2}$ is a micropore volume of the second catalyst,
$V_{MESO\_HC}$ is a mesopore volume of the mixed catalyst,
$V_{MESO\_C1}$ is a mesopore volume of the first catalyst, and
$V_{MESO\_C2}$ is a mesopore volume of the second catalyst.

2. The mixed catalyst according to claim 1, wherein, when any physical property selected from the group consisting of the BET surface area ($S_{BET\_HC}$), micropore surface area ($S_{MICRO\_HC}$), external surface area ($S_{EX\_HC}$), total pore volume ($V_{T\_HC}$), micropore volume ($V_{MICRO\_HC}$), and mesopore volume ($V_{MESO\_HC}$) is measured for each of five or more samples taken from the mixed catalyst, a standard deviation of the physical property is not more than 5% of an arithmetic average of the physical property.

3. The mixed catalyst according to claim 1, wherein the first and second supports have a shape selected from the group consisting of a spherical shape, a polyhedral shape, a linear shape, a tubular shape, and a planar shape, and
the shape of the first support is the same as that of the second support.

4. The mixed catalyst according to claim 1, wherein each of the first and second catalytic metal particles comprises platinum or a platinum-based alloy.

5. The mixed catalyst according to claim 4, wherein the first and second catalytic metal particles are the same material.

6. A method of preparing a mixed catalyst for a fuel cell having a target BET surface area, a target micropore surface area, a target external surface area, a target total pore volume, a target micropore volume, and a target mesopore volume, the method comprising:
a first step of determining a first catalyst including a first support and first catalytic metal particles dispersed on the first support, the first catalyst having a first BET surface area and a first total pore volume;
a second step of determining a second catalyst including a second support and second catalytic metal particles dispersed on the second support, the second catalyst having a second BET surface area different from the first BET surface area and a second total pore volume different from the first total pore volume;
a third step of determining a mixing ratio of the first and second catalysts; and
a fourth step of mixing the first catalyst with the second catalyst at the mixing ratio using a resonant acoustic mixer,
wherein the first and second catalysts are each independently (i) a first-type catalyst having a BET surface area of 150 m²/g or more and a total pore volume of 0.50 cm³/g or more, or (ii) a second-type catalyst having a BET surface area of less than 150 m²/g and a total pore volume of less than 0.50 cm³/g,
wherein (a) when the first and second catalysts are catalysts of the same type, the first, second and third steps are performed such that the following Equations 13 to 18 are satisfied, and (b) when the first and second catalysts are catalysts of different types, the first, second and third steps are performed such that the following Equations 19 to 24 are satisfied:

$$S_{BET\_C1} \cdot R_{C1} + S_{BET\_C2} \cdot R_{C2} \leq TS_{BET\_HC} \leq (S_{BET\_C1} \cdot R_{C1} + S_{BET\_C2} \cdot R_{C2}) \cdot 1.25 \quad \text{[Equation 13]}$$

$$(S_{MICRO\_C1} \cdot R_{C1} + S_{MICRO\_C2} \cdot R_{C2}) \cdot 0.75 \leq TS_{MICRO\_HC} \leq S_{MICRO\_C1} \cdot R_{C1} + S_{MICRO\_C2} \cdot R_{C2} \quad \text{[Equation 14]}$$

$$S_{EX\_C1} \cdot R_{C1} + S_{EX\_C2} \cdot R_{C2} \leq TS_{EX\_HC} \leq (S_{EX\_C1} \cdot R_{C1} + S_{EX\_C2} \cdot R_{C2}) \cdot 1.25 \quad \text{[Equation 15]}$$

$$V_{T\_C1} \cdot R_{C1} + V_{T\_C2} \cdot R_{C2} \leq TV_{T\_HC} \leq (V_{T\_C1} \cdot R_{C1} + V_{T\_C2} \cdot R_{C2}) \cdot 1.15 \quad \text{[Equation 16]}$$

$$(V_{MICRO\_C1} \cdot R_{C1} + V_{MICRO\_C2} \cdot R_{C2}) \cdot 0.85 \leq TV_{MICRO\_HC} \leq V_{MICRO\_C1} \cdot R_{C1} + V_{MICRO\_C2} \cdot R_{C2} \quad \text{[Equation 17]}$$

$$V_{MESO\_C1} \cdot R_{C1} + V_{MESO\_C2} \cdot R_{C2} \leq TV_{MESO\_HC} \leq (V_{MESO\_C1} \cdot R_{C1} + V_{MESO\_C2} \cdot R_{C2}) \cdot 1.15 \quad \text{[Equation 18]}$$

$$(S_{BET\_C1} \cdot R_{C1} + S_{BET\_C2} \cdot R_{C2}) \cdot 0.75 \leq TS_{BET\_HC} \leq (S_{BET\_C1} \cdot R_{C1} + S_{BET\_C2} \cdot R_{C2}) \cdot 1.25 \quad \text{[Equation 19]}$$

$$(S_{MICRO\_C1} \cdot R_{C1} + S_{MICRO\_C2} \cdot R_{C2}) \cdot 0.75 \leq TS_{MICRO\_HC} \leq (S_{MICRO\_C1} \cdot R_{C1} + S_{MICRO\_C2} \cdot R_{C2}) \cdot 1.25 \quad \text{[Equation 20]}$$

$$(S_{EX\_C1} \cdot R_{C1} + S_{EX\_C2} \cdot R_{C2}) \cdot 0.75 \leq TS_{EX\_HC} \leq (S_{EX\_C1} \cdot R_{C1} + S_{EX\_C2} \cdot R_{C2}) \cdot 1.25 \quad \text{[Equation 21]}$$

$$(V_{T\_C1} \cdot R_{C1} + V_{T\_C2} \cdot R_{C2}) \cdot 0.85 \leq TV_{T\_HC} \leq (V_{T\_C1} \cdot R_{C1} + V_{T\_C2} \cdot R_{C2}) \cdot 1.15 \quad \text{[Equation 22]}$$

$$(V_{MICRO\_C1} \cdot R_{C1} + V_{MICRO\_C2} \cdot R_{C2}) \cdot 0.85 \leq TV_{MICRO\_HC} \leq (V_{MICRO\_C1} \cdot R_{C1} + V_{MICRO\_C2} \cdot R_{C2}) \cdot 1.15 \quad \text{[Equation 23]}$$

$$(V_{MESO\_C1} \cdot R_{C1} + V_{MESO\_C2} \cdot R_{C2}) \cdot 0.85 \leq TV_{MESO\_HC} \leq (V_{MESO\_C1} \cdot R_{C1} + V_{MESO\_C2} \cdot R_{C2}) \cdot 1.15 \quad \text{[Equation 24]}$$

wherein $TS_{BET\_HC}$ is the target BET surface area,
$S_{BET\_C1}$ is the first BET surface area,
$S_{BET\_C2}$ is the second BET surface area,
$R_{C1}$ is a ratio of a weight of the first catalyst to a weight of the mixed catalyst,
$R_{C2}$ is a ratio of a weight of the second catalyst to the weight of the mixed catalyst (i.e., $R_{C2}=1-R_{C1}$),
$TS_{MICRO\_HC}$ is the target micropore surface area,
$S_{MICRO\_C1}$ is a micropore surface area of the first catalyst,
$S_{MICRO\_C2}$ is a micropore surface area of the second catalyst,
$TS_{EX\_HC}$ is the target external surface area,
$S_{EX\_C1}$ is an external surface area of the first catalyst,
$S_{EX\_C2}$ is an external surface area of the second catalyst,
$TV_{T\_HC}$ is the target total pore volume,
$V_{T\_C1}$ is the first total pore volume,
$V_{T\_C2}$ is the second total pore volume,
$TV_{MICRO\_HC}$ is the target micropore volume,
$V_{MICRO\_C1}$ is a micropore volume of the first catalyst,
$V_{MICRO\_C2}$ is a micropore volume of the second catalyst,
$TV_{MESO\_HC}$ is the target mesopore volume,
$V_{MESO\_C1}$ is a mesopore volume of the first catalyst, and
$V_{MESO\_C2}$ is a mesopore volume of the second catalyst.

7. The method according to claim 6, wherein the fourth step is performed at a frequency of 55 to 65 Hz and an acceleration of 30 to 90 G for 1 to 20 minutes.

8. The method according to claim 6, wherein a mixture obtained through the fourth step is a solid phase mixture.

9. The method according to claim 6, wherein the first and second supports have a shape selected from the group consisting of a spherical shape, a polyhedral shape, a linear shape, a tubular shape, and a planar shape, and
the shape of the first support is the same as that of the second support.

10. The method according to claim 6, wherein each of the first and second catalytic metal particles comprises platinum or a platinum-based alloy.

11. The method according to claim 10, wherein the first and second catalytic metal particles are the same material.

12. A method of forming an electrode on a polymer electrolyte membrane, the method comprising:
dispersing the mixed catalyst prepared according to claim 6 along with an ionomer in a dispersion medium to prepare an electrode slurry;
coating a substrate with the electrode slurry; and
drying the coated electrode slurry.

13. The method according to claim 12, wherein the substrate is a release film, and the method of forming the electrode further comprises:
transferring the electrode formed on the release film by drying onto the polymer electrolyte membrane; and
removing the release film.

14. The method according to claim 12, wherein the substrate is the polymer electrolyte membrane.

15. A membrane-electrode assembly comprising:
an anode;
a cathode; and
a polymer electrolyte membrane interposed between the anode and the cathode,
wherein at least one selected from the group consisting of the anode and the cathode comprises the mixed catalyst according to claim 1.

* * * * *